(12) United States Patent
Choi et al.

(10) Patent No.: US 8,953,025 B2
(45) Date of Patent: Feb. 10, 2015

(54) ALIGN MARK OF STEREOSCOPIC IMAGE DISPLAY, ALIGNING METHOD AND SYSTEM USING THE ALIGN MARK

(75) Inventors: ByungJin Choi, Paju-si (KR); Hongsung Song, Goyang-si (KR); Seoksu Kim, Gumi-si (KR); Woongki Min, Daegu (KR); Donghak Lee, Gumi-si (KR); Wonki Park, Paju-si (KR); Hyunseung Kim, Seoul (KR); Hyunjin Song, Jeonju-si (KR)

(73) Assignee: LG Display Co., Ltd., Seoul (KR)

( * ) Notice: Subject to any disclaimer, the term of this patent is extended or adjusted under 35 U.S.C. 154(b) by 538 days.

(21) Appl. No.: 13/330,289

(22) Filed: Dec. 19, 2011

(65) Prior Publication Data
US 2012/0162211 A1 Jun. 28, 2012

(30) Foreign Application Priority Data

Dec. 23, 2010 (KR) .......... 10-2010-0133412
Dec. 29, 2010 (KR) .......... 10-2010-0138249
Apr. 13, 2011 (KR) .......... 10-2011-0034422

(51) Int. Cl.
G06T 15/00 (2011.01)
G02B 27/26 (2006.01)
G02B 5/30 (2006.01)

(52) U.S. Cl.
CPC ............ *G02B 27/26* (2013.01); *G02B 5/3083* (2013.01)

USPC .......................................... 348/51

(58) Field of Classification Search
USPC .................. 349/15, 465; 348/51, 57, 58
See application file for complete search history.

(56) References Cited

U.S. PATENT DOCUMENTS

| 2002/0012088 | A1* | 1/2002 | Ozawa et al. ............ 349/123 |
| 2004/0012851 | A1* | 1/2004 | Sato et al. .................. 359/464 |
| 2006/0164578 | A1* | 7/2006 | Matsumoto et al. ...... 349/117 |
| 2010/0002051 | A1* | 1/2010 | Yoshimura ................. 347/40 |
| 2010/0026993 | A1* | 2/2010 | Kim et al. .................. 356/124 |
| 2011/0086193 | A1* | 4/2011 | Nakazono et al. ........ 428/41.8 |

FOREIGN PATENT DOCUMENTS

TW 200951491 A 12/2009

* cited by examiner

*Primary Examiner* — Hung Dang
*Assistant Examiner* — Sunghyoun Park
(74) *Attorney, Agent, or Firm* — Birch, Stewart, Kolasch & Birch, LLP

(57) ABSTRACT

An align marking for a stereoscopic image display apparatus and an alignment method and system using the align marking are discussed. The align marking includes a first align mark formed at a left and central portion of the display panel, and a second align mark formed at a right and central portion of the display panel, wherein each of the first and second align marks comprises one or more left patterns and one or more right patterns arranged offset from the one or more left patterns, wherein the first and second align marks are aligned with a predetermined reference line formed on the pattern retarder.

14 Claims, 24 Drawing Sheets

FPR (Top)

| 71 |
|---|
| 72 |
| 73 |
| 74 |
| 75 |
| 76 |

(Bottom)

ALIGN MARK OF STEREOSCOPIC IMAGE DISPLAY, ALIGNING METHOD AND SYSTEM USING THE ALIGN MARK

CROSS REFERENCE TO RELATED APPLICATIONS

This application claims priority to and the benefit of Korea Patent Application No. 10-2010-0133412 filed on Dec. 23, 2010, Korea Patent Application No. 10-2010-0138249 filed on Dec. 29, 2010, and Korea Patent Application No. 10-2011-0034422 filed on Apr. 13, 2011, the entire contents of which are incorporated herein by reference.

BACKGROUND OF THE INVENTION

1. Field of the Invention

The embodiments of the invention are directed to align marks for a stereoscopic image display apparatus and an alignment method and system for a stereoscopic image display apparatus using the align marks.

2. Discussion of the Related Art

Stereoscopic image display apparatuses display 3D images using a stereoscopic technique or autostereoscopic technique. The stereoscopic technique resorts to using parallax between left and right eyes, and may or may not use specific glasses to provide a 3D effect. When using the specific glasses, as a direct-emissive type display device or projector displays left and right images with their polarization direction changed or in a time-division manner, a viewer sees 3D images through polarization glasses or shutter glasses. With no glasses, optical parts, such as a parallax barrier or lenticular lens, are installed in front of or behind the display screen to separate the optical axes of the left and right images.

In the 3D image implementations adopting polarization glasses, a polarization separation element, such as a pattern retarder, is required to be attached on the display panel. The pattern retarder renders the polarization of the left and right-eyed images displayed on the display panel to be different from each other. When watching a 3D image displayed on the stereoscopic image display apparatus using polarization glasses, a viewer feels left-eyed image polarized light through a left-eyed filter of the polarization glasses and right-eyed image polarized light through a right-eyed filter of the polarization glasses, thereby perceiving a 3D effect.

The shutter glasses-type stereoscopic image display apparatus, however, alternately displays left and right-eyed images on the display panel and opens the left and right shutters of the shutter glasses in synchronization with the left and right-eyed images, respectively, without use of a polarization separation element. A viewer sees the left-eyed image through the left shutter and the right-eyed image through the right shutter, thereby perceiving a 3D effect. Despite no need of any polarization separation element, the shutter glasses-type stereoscopic image display apparatus suffers from high price due to expensive shutter glasses. From the point of view of 3D image quality, the shutter glasses-type stereoscopic image display apparatus is disadvantageous because the left and right-eyed images are subjected to time division with a predetermined time interval, which increases flicker and 3D crosstalk compared to the polarization glasses-type display apparatus, thereby leading to an increase in viewers' fatigue. The "flicker" refers to a phenomenon in which brightness of an image displayed on the display panel fluctuates at a constant time interval. The "3D crosstalk" refers to a viewer perceiving the left and right-eyed images displayed on the display panel with a single eye (left eye or right eye) at the same time, so that the user perceives overlap of the images.

In the shutter glasses-type stereoscopic display apparatus, each of the left and right shutter needs to be electrically opened/closed in synchronization with the display panel. For this purpose, the shutter glasses include a synchronization circuit for opening and closing the left and right shutters. The synchronization circuit includes an infrared (IR) receiving circuit, a driving voltage switching circuit, or the like. For this reason, the shutter glasses-type stereoscopic image display apparatus requires high-cost shutter glasses. The shutter glasses generate electromagnetic radiations.

Because of use of low-cost polarization glasses, the polarization glasses-type stereoscopic image display apparatus enjoys a lower price than that the shutter glasses-type stereoscopic image display apparatus in spite of requiring a polarization separation element to be attached onto the display panel. In the polarization glasses-type stereoscopic image display apparatus, the left and right-eyed images are simultaneously displayed on the display panel and are split on a per-line basis, so that a lower degree of flicker and 3D crosstalk occurs than when a 3D image is realized by the shutter glasses-type display apparatus, thus reducing fatigue that a viewer may feel.

The pattern retarders are classified into glass pattern retarders (GPRs) in which a pattern retarder is formed on a glass substrate and film pattern retarders (FPRs) in which a pattern retarder is formed on a film substrate. The film pattern retarders are more advantageous than the glass pattern retarders because of ability to reduce thickness, weight, and prices of the display panel. Accordingly, research on the film pattern retarders is intensively ongoing.

In the polarization glasses-type stereoscopic image display apparatus, accuracy in alignment between the pattern retarder and display panel has a significant influence on price, productivity, and 3D image quality. According to a conventional method of aligning the pattern retarder with the display panel, align marks AM1' to AM4' are formed on the display panel PNL and align marks AM1 to AM4 are formed on the pattern retarder PR as shown in FIG. 1, and the display panel PNL is attached onto the pattern retarder PR while the display panel PNL and the pattern retarder PR are aligned with each other so that the align marks AM1 to AM4 conform to the align marks AM1' to AM4' along a vertical direction.

A separate process is required in manufacturing the pattern retarder PR to form the align marks AM1 to AM4 on the pattern retarder PR.

The align marks AM1 to AM4 need to be formed while the substrate (or film) of the pattern retarder PR remains stationary, which the manufacturing process of the pattern retarder PR cannot be performed continuously, thus resulting in a delay for process time.

Along with the align marks AM1 to AM4, patterns are formed on the pattern retarder PR to be opposite to pixels of the display panel PNL in order to separate polarization characteristics of the left and right-eyed images. A misalignment can occur between the patterns of the pattern retarder PR and the align marks AM1 to AM4. Under this circumstance, even when the align marks AM1 to AM4 of the pattern retarder PR are precisely aligned with the align marks AM1' to AM4' of the display panel PNL thanks to an alignment error between the align marks AM1 to AM4 and patterns of pattern retarder PR, an alignment error ends up created between the patterns of the pattern retarder PR and the pixels of the display panel PNL.

SUMMARY OF THE INVENTION

The embodiments of the invention provide align marks for a stereoscopic image display apparatus that can reduce an alignment error between a pattern retarder and a display panel, and an alignment method and system using the align marks.

According to an embodiment of the invention, an align marking includes a first align mark formed at a left middle portion of the display panel and a second align mark formed at a right middle portion of the display panel.

Each of the first and second align marks includes one or more left patterns and one or more right patterns arranged offset from the one or more left patterns.

The first and second align marks are aligned with a reference line that is based on polarization selection patterns of the pattern retarder.

According to an embodiment of the invention, an alignment method for a stereoscopic image display apparatus includes finding a reference line of the pattern retarder that is spaced apart by a predetermined distance from one of dummy patterns formed at upper and lower ends of the pattern retarder, aligning the reference line of the pattern retarder with the first and second align marks of the display panel, and attaching the pattern retarder to the display panel when the reference line of the pattern retarder is aligned with the first and second align marks of the display panel within a permissible alignment error range.

According to an embodiment of the invention, an alignment system for a stereoscopic image display apparatus includes a first align stage supporting a pattern retarder including dummy patterns formed at upper and lower ends and first and second polarization selection patterns formed between the dummy patterns, a first vision system capturing any one of the dummy patterns of the pattern retarder and capturing a reference line between the first and second polarization selection patterns positioned at a center of the pattern retarder, a second align stage supporting a display panel a first align mark formed at a left middle portion and a second align mark formed at a right middle portion, a second vision system capturing images of the first and second align marks of the display panel, a drum receiving the pattern retarder from the first align stage and attaching the pattern retarder onto the display panel on the second align stage when the reference line of the pattern retarder is aligned with the first and second align marks of the display panel within a permissible alignment error range, and a control computer analyzing images received from the first and second vision systems and controlling activation of at least one of the first and second align stages and activation of the drum so that the reference line of the pattern retarder is aligned with the first and second align marks of the display panel within the permissible alignment error range.

BRIEF DESCRIPTION OF THE DRAWINGS

The accompanying drawings, which are included to provide a further understanding of the embodiments and are incorporated in and constitute a part of this specification, illustrate embodiments and together with the description serve to explain the principles of the embodiments. In the drawings.

DETAILED DESCRIPTION OF THE EMBODIMENTS

Figure 1:
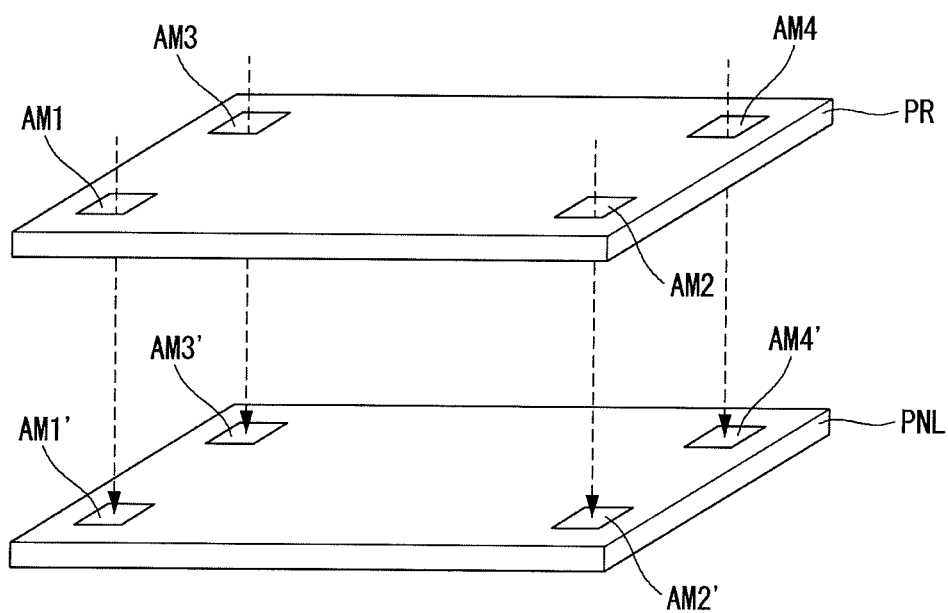
FIG. 1 is a view illustrating forming align marks on each of a pattern retarder and a display panel, and aligning the pattern retarder and display panel with each other based on the align marks according to a related art.

Hereinafter, example embodiments of the invention will be described in greater detail with reference to the accompanying drawings, wherein the same reference numerals may be used to denote the same or substantially the same elements throughout the specification and the drawings. Detailed description on well-known functions or configurations that obscures the essence of the invention unclear will be omitted.

Figure 2:
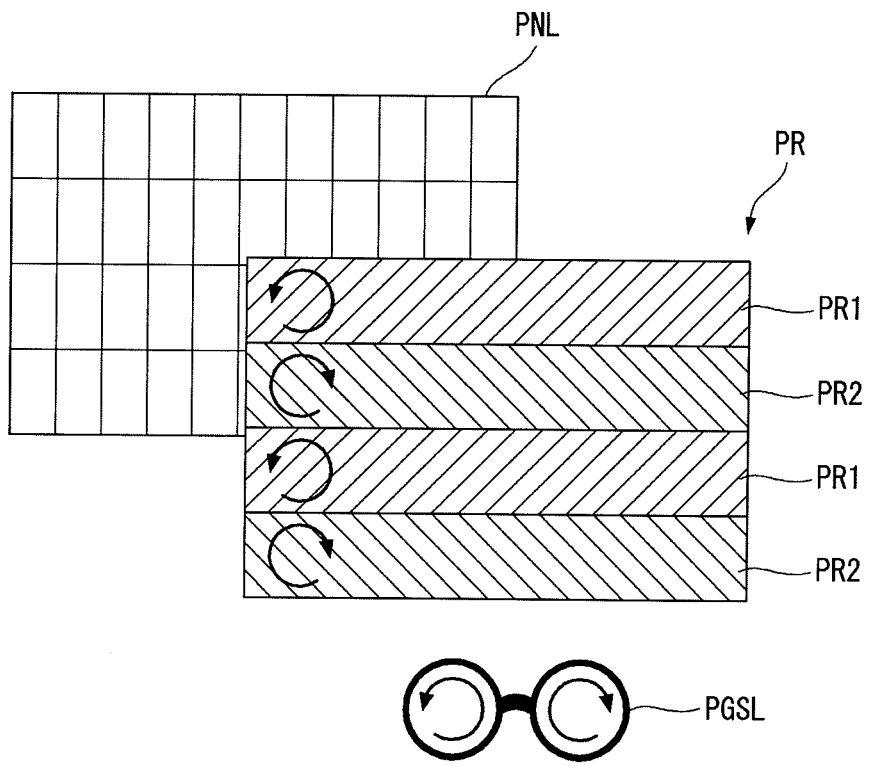
FIG. 2 is a view schematically illustrating a stereoscopic image display apparatus according to an embodiment.

FIG. 2 is a view schematically illustrating a stereoscopic image display apparatus according to an embodiment.

Referring to FIG. 2, a stereoscopic image display apparatus according to an embodiment includes a display panel PNL, a film pattern retarder FPR, and polarization glasses PGLS.

The display panel PNL may be implemented as a display panel for flat display apparatuses, such as field emission display (FED), plasma display panel (PDP), organic light emitting display (OLED), or electrophoresis display (EPD).

The display panel PNL displays 2D image video data on a pixel array in a 2D mode. In a 3D mode, the display panel PNL separates a left-eye image and a right-eye image from each other on a per-line basis in the pixel array and simultaneously displays the left-eye and right-eye images.

The film pattern retarder FPR is attached onto the display panel PNL. An optical axis of first polarization selection patterns PR1 is perpendicular to an optical axis of second polarization selection patterns PR2 in the film pattern retarder FPR. In the film pattern retarder FPR, the first and second polarization selection patterns PR1 and PR2 are alternately arranged. The first polarization selection patterns PR1 delay a light for a left-eye image (or right-eye image) displayed on odd-numbered lines of the display panel PNL and transmit light of a first polarized light. The second polarization selection patterns PR2 delay a light for a right-eye image (or left-eye image) displayed on even-numbered lines of the display panel PNL and transmit light of a second polarized light. The first polarized light is a circularly polarized light or a linearly polarized light, and the second polarized light is a circularly polarized light or a linearly polarized light whose optical axis is perpendicular to an optical axis of the first polarized light.

The polarized glasses PGLS includes a left-eye filter and a right-eye filter. The left-eye filter has the same optical axis as an optical axis of the first polarization selection patterns PR1 of the film pattern retarder FPR. The right-eye filter has the same optical axis as an optical axis of the second polarization selection patterns PR2 of the film pattern retarder FPR. Accordingly, a viewer sees only pixels displaying a left-eye image through the left-eye filter of the polarization glasses PGLS and only pixels displaying a right-eye image through the right-eye filter of the polarization glasses PGLS, so that binocular parallax is created, thereby enabling the viewer to perceive a 3D effect.

Figure 3:
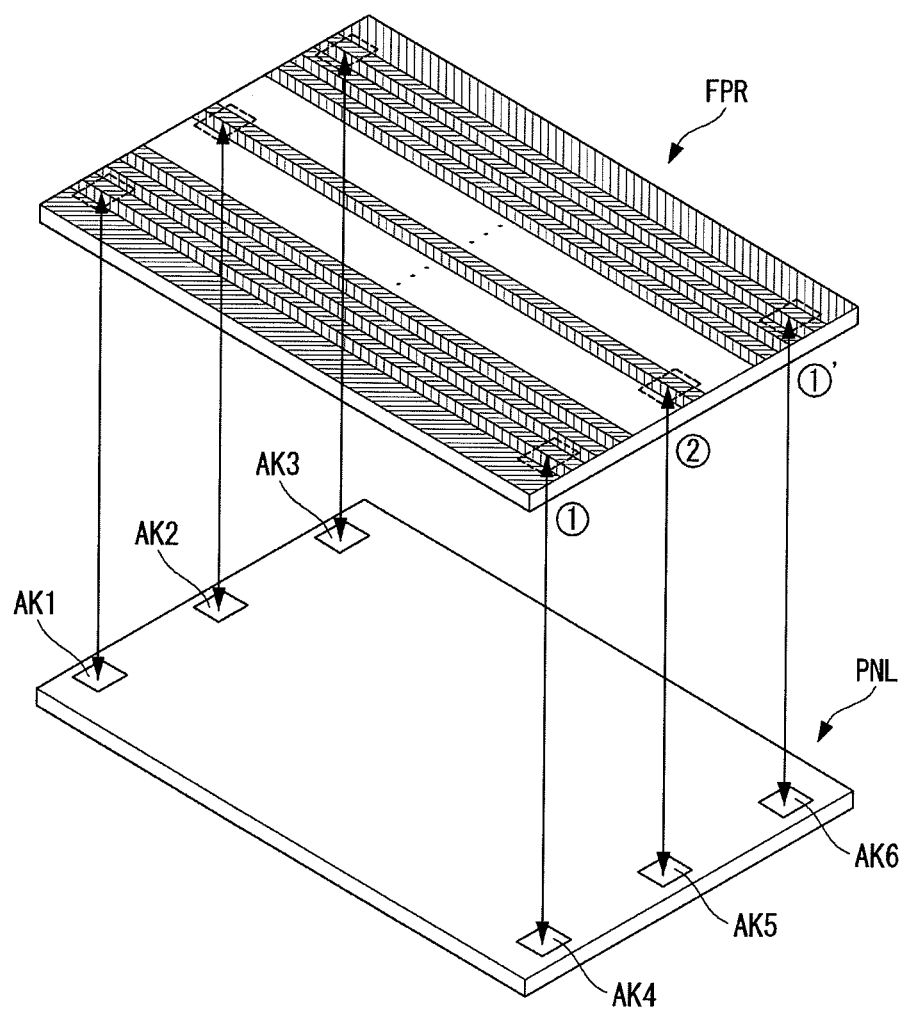
FIG. 3 is a view illustrating a method of aligning a stereoscopic image display apparatus according to an embodiment.

FIG. 3 illustrates a method of aligning a stereoscopic image display apparatus according to an embodiment.

According to the method illustrated in FIG. 3, a film pattern retarder FPR with no align mark is aligned with a display panel PNL with align marks AK1 to AK6. A plurality to align marks may be referred to as an align marking.

Figure 4:
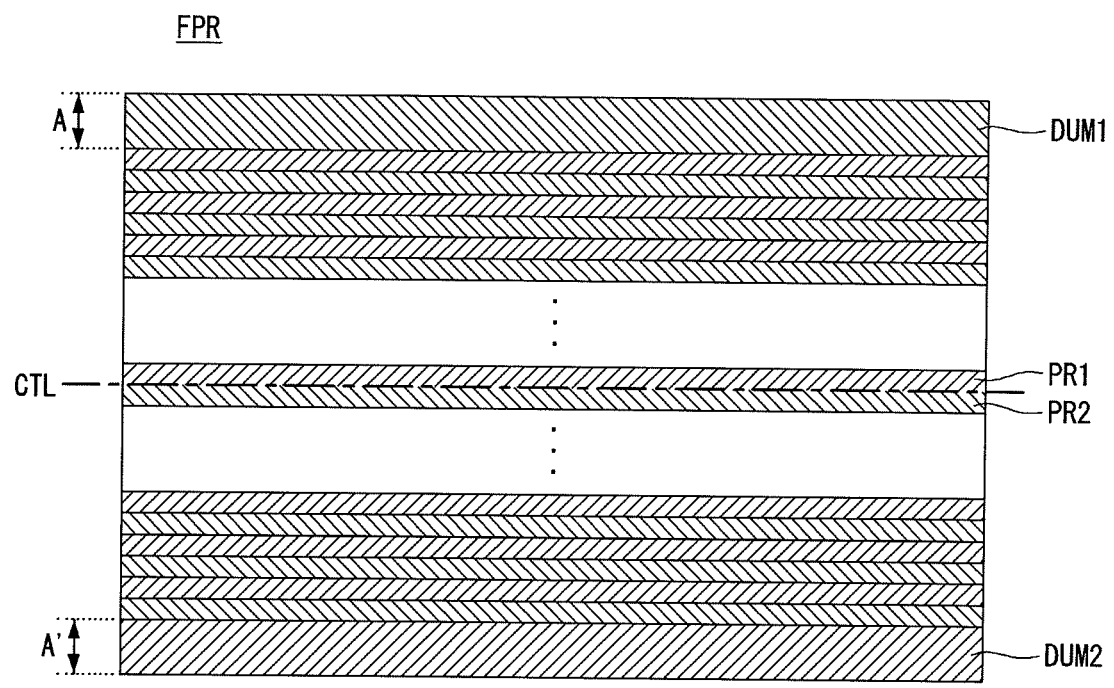
FIG. 4 is a plan view illustrating in detail a film pattern retarder according to an embodiment.

As shown in FIG. 4, the film pattern retarder FPR includes first and second polarization selection patterns PR1 and PR2 for separating a polarized light for a left-eye image (also referred to as a "left-eye image polarized light") and a polarized light for a right-eye image (also referred to as a "right-eye image polarized light") from each other. The first and second polarization selection patterns PR1 and PR2 face a pixel array of the display panel PNL. The pixel array of the display panel PNL includes a display area that includes pixels displaying a 2D or 3D image.

The first and second polarization selection patterns PR1 and PR2 have different optical axes from each other, delay a phase of incident light by a predetermined phase value and transmit the phase-delayed light as polarized lights whose optical axes are perpendicular to each other, thereby making the left-eye image and right-eye image different in polarization characteristics from each other. For example, the first polarization selection patterns PR1 have a first optical axis and face odd-numbered lines of the pixel array of the display panel PNL to delay a phase of a linearly polarized light coming from the odd-numbered lines by ¼ wavelength and transmits a left-eye (or right-eye) light displayed on the odd-number lines as a first polarized light. The second polarization selection patterns PR2 have a second optical axis perpendicular to the first optical axis and face even-numbered lines of the pixel array of the display panel PNL to delay a phase of a linearly polarized light coming from the even-numbered lines by ¼ wavelength and transmits a right-eye (or left-eye) light displayed on the even-number lines as a second polarized light.

According to an embodiment of the invention, when the number of lines in the pixel array of the display panel PNL is N (N is an even number), the number of lines in the film pattern retarder FPR by adding both the first and second polarization selection patterns PR1 and PR2 may be N. According to an embodiment of the invention, the number of either the first polarization selection patterns PR1 or the second polarization selection patterns PR2 is N/2.

According to an another embodiment of the invention, when the number of lines in the pixel array of the display panel PNL is N, the number of lines in the film pattern retarder FPR by adding both the first and second polarization selection patterns PR1 and PR2 may be N+1. In this case, one of the number of the first polarization selection patterns PR1 and the number of the second polarization selection patterns PR2 is N/2, and the other is N/2+1. For example, the number of the first polarization selection patterns PR1 is N/2 +1, and the number of the second polarization selection patterns PR2 is N/2. Alternatively, the number of the second polarization selection patterns PR2 is N/2 +1, and the number of the first polarization selection patterns PR1 is N/2.

The film pattern retarder FPR further includes an upper dummy area and a lower dummy area. At least one of the upper and lower dummy areas of the film pattern retarder FPR includes dummy patterns DUM1 and DUM2. The dummy patterns DUM1 and DUM2 are used as reference patterns for identifying the upper and lower dummy areas of the film pattern retarder FPR when aligning the film pattern retarder FPR and the display panel PNL. The dummy patterns DUM1 and DUM2 face a non-display area outside the pixel array area of the display panel PNL. Accordingly, the dummy patterns DUM1 and DUM2 do not face the pixels in the pixel array.

The dummy patterns DUM1 and DUM2 are respectively formed at the upper and lower dummy areas of the film pattern retarder FPR. Each of the dummy patterns DUM1 and DUM2 has the same width as a width of each of the first and second polarization selection patterns PR1 and PR2, or has a width different from a width of each of the first and second polarization selection patterns PR1 and PR2 to be easily distinguishable from the first and second polarization selection patterns PR1 and PR2 opposite to the pixel array area of the display panel.

FIG. 4 illustrates an example where widths of the dummy patterns DUM1 and DUM2 are larger than widths of the polarization selection patterns PR1 and PR2. However, the embodiments of the invention are not limited thereto. For example, each of the dummy patterns DUM1 and DUM2 may have one or more patterns each having the same width as a width of the first and second polarization selection patterns PR1 and PR2. According to an embodiment of the invention, the dummy patterns DUM1 and DUM2 respectively have widths A and A' that are larger than a width of each of the first and second polarization selection patterns PR1 and PR2 as shown in FIG. 4. Alternatively, the dummy patterns DUM1 and DUM2 respectively have widths A and A' that are smaller than a width of each of the first and second polarization selection patterns PR1 and PR2. The first dummy pattern DUM1 is formed at the upper dummy area of the film pattern retarder FPR and has the same polarization characteristics as one of the first and second polarization selection patterns PR1 and PR2, and the second dummy pattern DUM2 is formed at the lower dummy area of the film pattern retarder FPR and has the same polarization characteristics as one of the first and second polarization selection patterns PR1 and PR2.

The dummy patterns DUM1 and DUM2 are not formed by a manufacturing process separate from a process for manufacturing the polarization selection patterns PR1 and PR2. Rather, the dummy patterns DUM1 and DUM2 are formed together with the polarization selection patterns PR1 and PR2 by the same method as a manufacturing method of the polarization selection patterns PR1 and PR2. Accordingly, according to the embodiments of the invention, the degree of a misalignment of the polarization selection patterns PR1 and PR2 may be easily identified by checking the dummy patterns DUM1 and DUM2 of the film pattern retarder FPR.

To facilitate differentiating the upper and lower dummy areas of the film pattern retarder FPR, polarization characteristics of the first dummy pattern DUM1 may be the same or different as/from polarization characteristics of the second dummy pattern DUM2. Accordingly, an embodiment of the invention may recognize a difference in polarization and/or width between the dummy patterns DUM1 and DUM2 and the polarization selection patterns PR1 and PR2 to differentiate the dummy patterns DUM1 and DUM2 from the polarization selection patterns PR1 and PR2.

According to an embodiment of the invention, to readily differentiate the upper dummy area from the lower dummy area in the film pattern retarder FPR, the width A of the first dummy pattern DUM1 formed at an upper end of the retarder FPR may be set to be different from the width A' of the second dummy pattern DUM2 formed at a lower end of the film pattern retarder FPR. For example, the width A of the first dummy pattern DUM1 may be larger or smaller than the width A' of the second dummy pattern DUM2. Accordingly, the dummy patterns DUM1 and DUM2 may be differentiated from the polarization selection patterns PR1 and PR2 by recognizing a difference in polarization and/or width between the dummy patterns DUM1 and DUM2 and the polarization selection patterns PR1 and PR2.

In the film pattern retarder FPR, a distance between the dummy pattern DUM1 or DUM2 and a reference line CTL is previously known as a factor for designing the film pattern retarder FPR. Accordingly, by identifying the positions of the dummy patterns DUM1 and DUM2, the position of the reference line CTL, which is located away from the dummy patterns DUM1 and DUM2 by a predetermined distance, may be known. The reference line CTL is a boundary line between the first and second polarization selection patterns PR1 and PR2 positioned at a center of the film pattern retarder FPR and align marks AK2 and AK5 positioned at a center of the display panel PNL when the film pattern retarder FPR is aligned with the display panel PNL. The reference line CTL of the film pattern retarder FPR is not formed by a separate process from a manufacturing process of the polarization selection patterns PR1 and PR2 but formed together with the polarization selection patterns PR1 and PR2.

When the film pattern retarder FPR is aligned with the display panel PNL, the reference line CTL of the film pattern retarder FPR is aligned with the align marks AK1 to AK6 of the display panel PNL. Accordingly, it is not necessary to form separate align marks at the film pattern retarder FPR.

Figure 5:
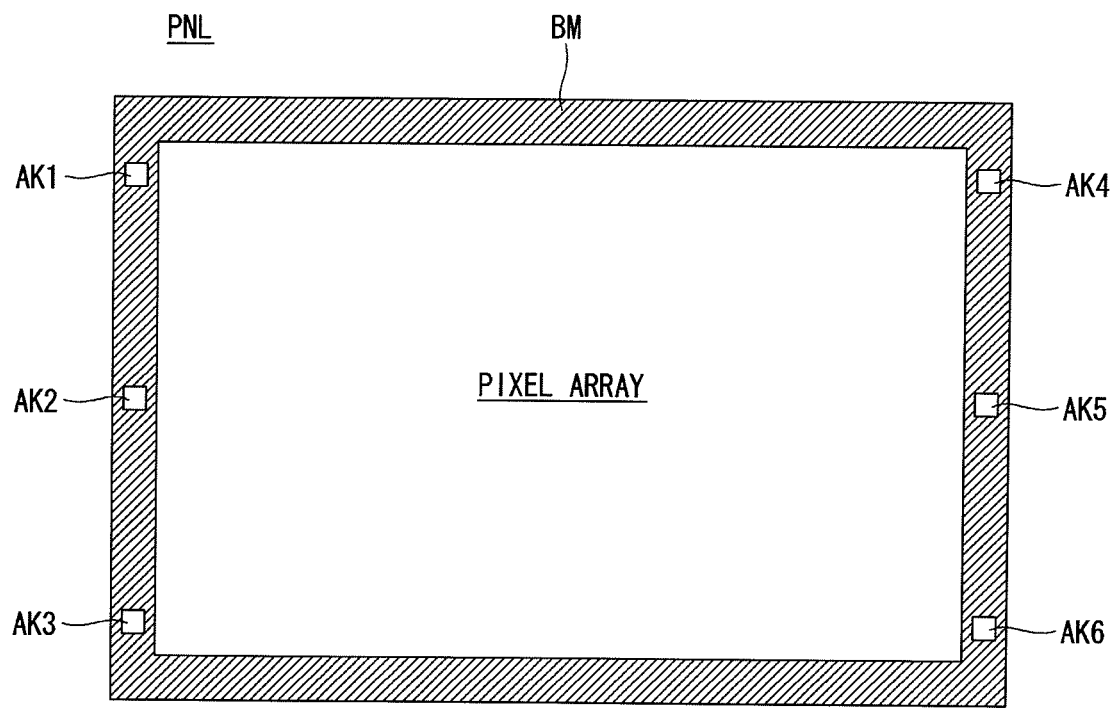
FIG. 5 is a plan view illustrating align marks of the display panel shown in FIG. 3.

With reference to FIGS. 3 and 5, display panel PNL includes a pixel array displaying a 2D/3D image and a bezel area at a peripheral portion outside the pixel array. The bezel area is a non-display area with no pixels, and includes black matrixes BM. The bezel area includes align marks AK1 to AK6 at six locations including upper, central, and lower portions of two opposite sides of the display panel. According to an embodiment of the invention, upper and lower align marks (i.e., AK1, AK3, AK4 and AK6) may be omitted from the align marks AK1 to AK6.

The left align marks AK1 to AK3 formed at a left bezel portion of the display panel PNL and the right align marks AK4 to AK6 formed at a right bezel portion of the display panel PNL are designed to have different pattern shapes so that left and right sides can be intuitively and easily identified. The align marks AK1 to AK6 include align patterns patterned simultaneously with black matrix patterns in the pixel array, and the align patterns may be formed to have various patterns as shown in FIGS. 6A to 7B. In embodiments of the invention, a panel reference line CTL-PNL is represented by a broken dashed line.

Figure 6A:
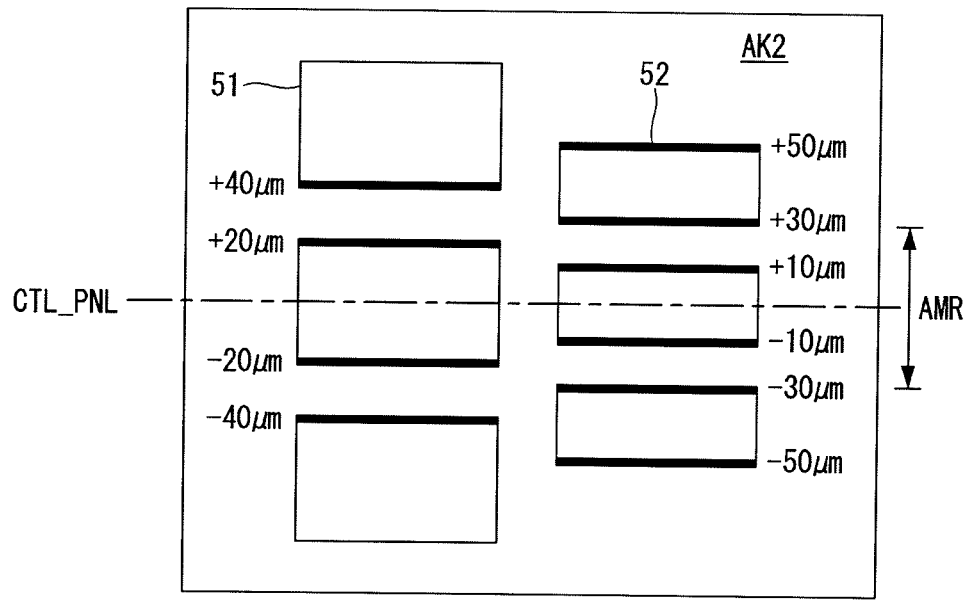
FIGS. 6A and 6B are magnified plan views illustrating some align marks according to embodiments.
Figure 6B:
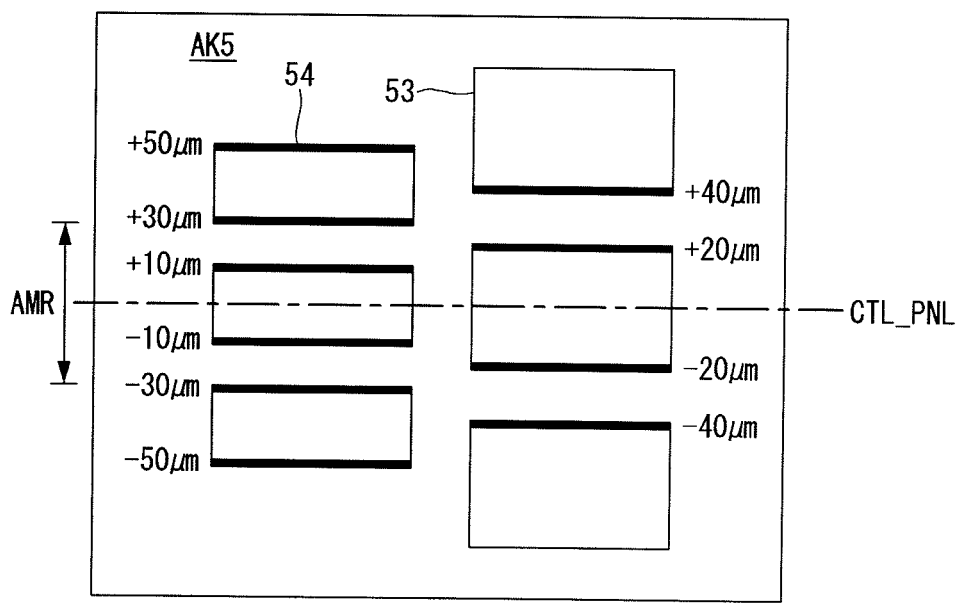

FIGS. 6A and 6B are magnified plan views illustrating some align marks according to embodiments, wherein FIG. 6A shows the second align mark AK2, and FIG. 6B shows the fifth align mark AK5. Each of the left-sided align marks AK1 to AK3 has substantially the same pattern as the second align mark AK2. Each of the right-sized align marks AK4 to AK6 has substantially the same patterns as the fifth align mark AK5.

Referring to FIGS. 6A and 6B, the second align mark AK2 includes left-sided align patterns 51 and right-sided align patterns 52.

The left-sided align patterns 51 include markings for indicating distances from a panel reference line CTL_PNL crossing a central portion of the display panel PNL. The left-sided align patterns 51 include 20 μm markings for indicating positions that are 20 μm apart from the panel reference line CTL_PNL and 40 μm markings for indicating positions that are 40 μm apart from the panel reference line CTL_PNL. The panel reference line CTL_PNL may not be formed in the align marks AK1 to AK6. The panel reference line CTL_PNL is preset in a control computer to be described and may be displayed on a monitor connected to the control computer together with images of the align marks captured by a vision system when aligning the film pattern retarder FPR with the display panel PNL.

The right-sided align patterns 52 include markings that are deviated or offset from the markings of the left-sided align patterns 51 by predetermined distances. The right-sided align patterns 52 include 10 μm markings for indicating positions that are 10 μm apart from the panel reference line CTL_PNL, 30 μm markings for indicating positions that are 30 μm apart from the panel reference line CTL_PNL, and 50 μm markings for indicating positions that are 50 μm apart from the panel reference line CTL_PNL.

The patterns of the fifth align mark AK5 are vertically symmetrical with the patterns of the second align marks AK2. The fifth align mark AK5 includes left-sided align patterns 54 and right-sided align patterns 53.

The left-sided align patterns 54 include markings for indicating distances from the panel reference line CTL_PNL. The left-sided align patterns 54 include 10 μm markings for indicating positions that are 10 μm apart from the panel reference line CTL_PNL, 30 μm markings for indicating positions that are 30 μm apart from the panel reference line CTL_PNL, and 50 μm markings for indicating positions that are 50 μm apart from the panel reference line CTL_PNL.

The right-sided align patterns 53 include markings that are deviated or offset from the markings of the left-sided align patterns 54 by predetermined distances. The right-sided align patterns 53 include 20 μm markings for indicating positions that are 20 µm apart from the panel reference line CTL_PNL and 40 µm markings for indicating positions that are 40 µm apart from the panel reference line CTL_PNL.

Figure 7A:
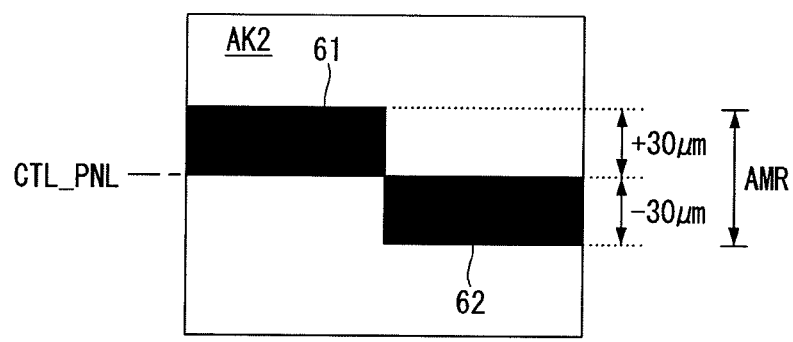
FIGS. 7A and 7B are expanded plan views illustrating some align marks according to embodiments
Figure 7B:
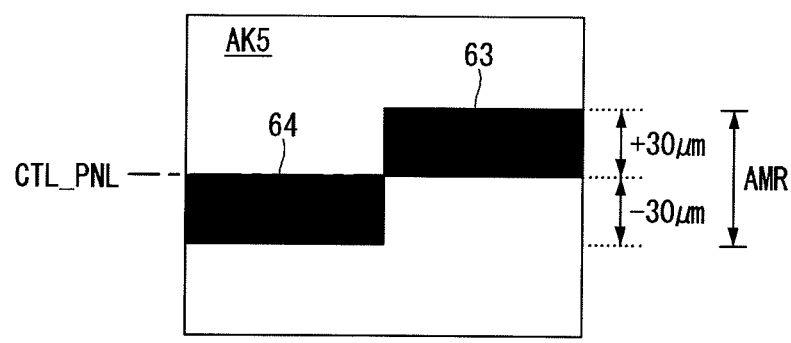

As shown in FIGS. 6A and 6B, numerals and units for indicating distances from the panel reference line CTL_PNL may be marked next to the markings of the align patterns 51, 52, 53, and 54 in each align mark AK1 to AK6. In the event that the markings of the align patterns 51 and 52 or 53 and 54 are provided at an interval of 10 µm as shown in FIGS. 6A and 6B, an error in alignment may be known every 10 µm when aligning the film pattern retarder FPR with the display panel PNL. The markings of the align patterns 51, 52, 53, and 54 are not limited to those shown in FIGS. 6A and 6B. For instance, the markings of the left and right alignment patterns 51 and 54, and 52 and 53 may be formed at an interval of 5 µm, or at an interval of 30 µm as shown in FIGS. 7A and 7B. Other intervals may be used in other embodiments.

Figure 8A:
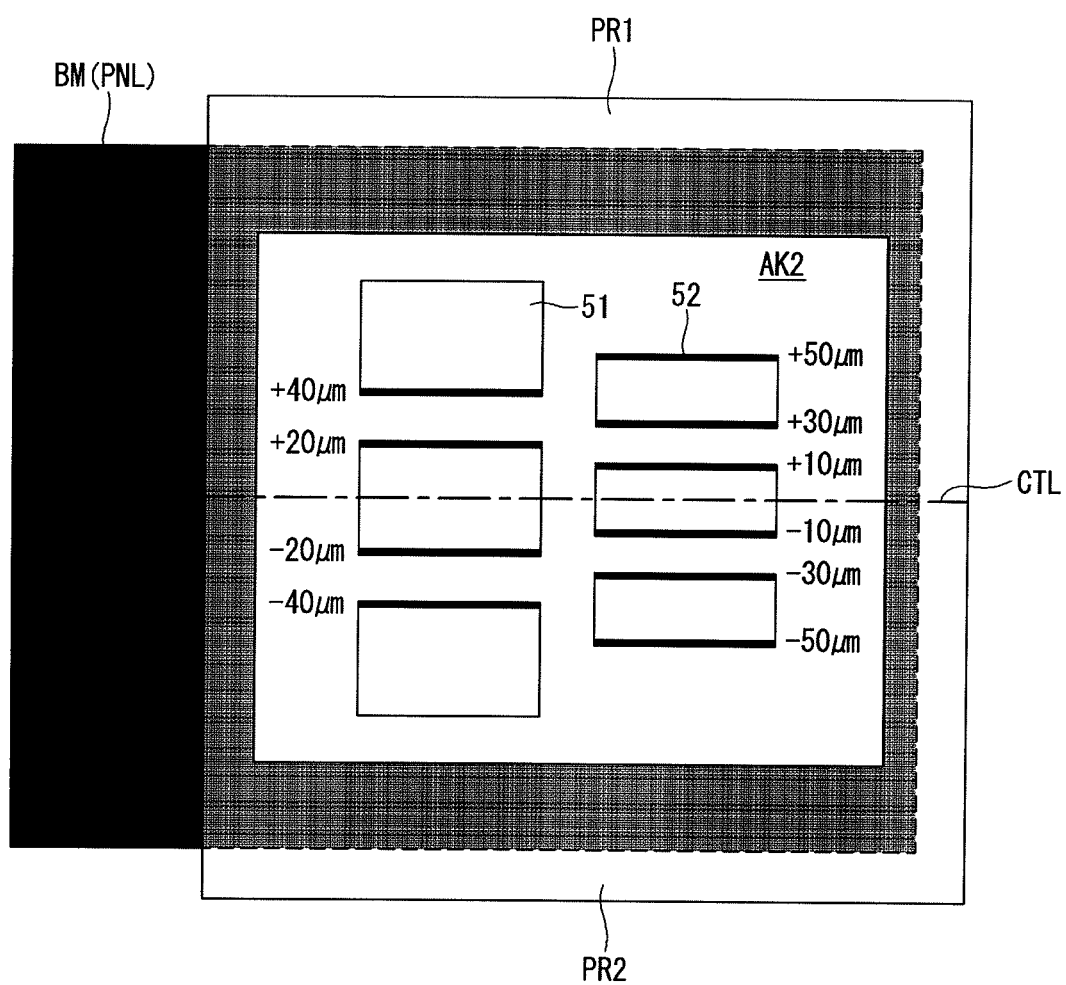
FIGS. 8A and 8B are plan views illustrating a status where the film pattern retarder and the display panel are ideally aligned with each other using the align marks shown in FIGS. 6A and 6B.
Figure 8B:
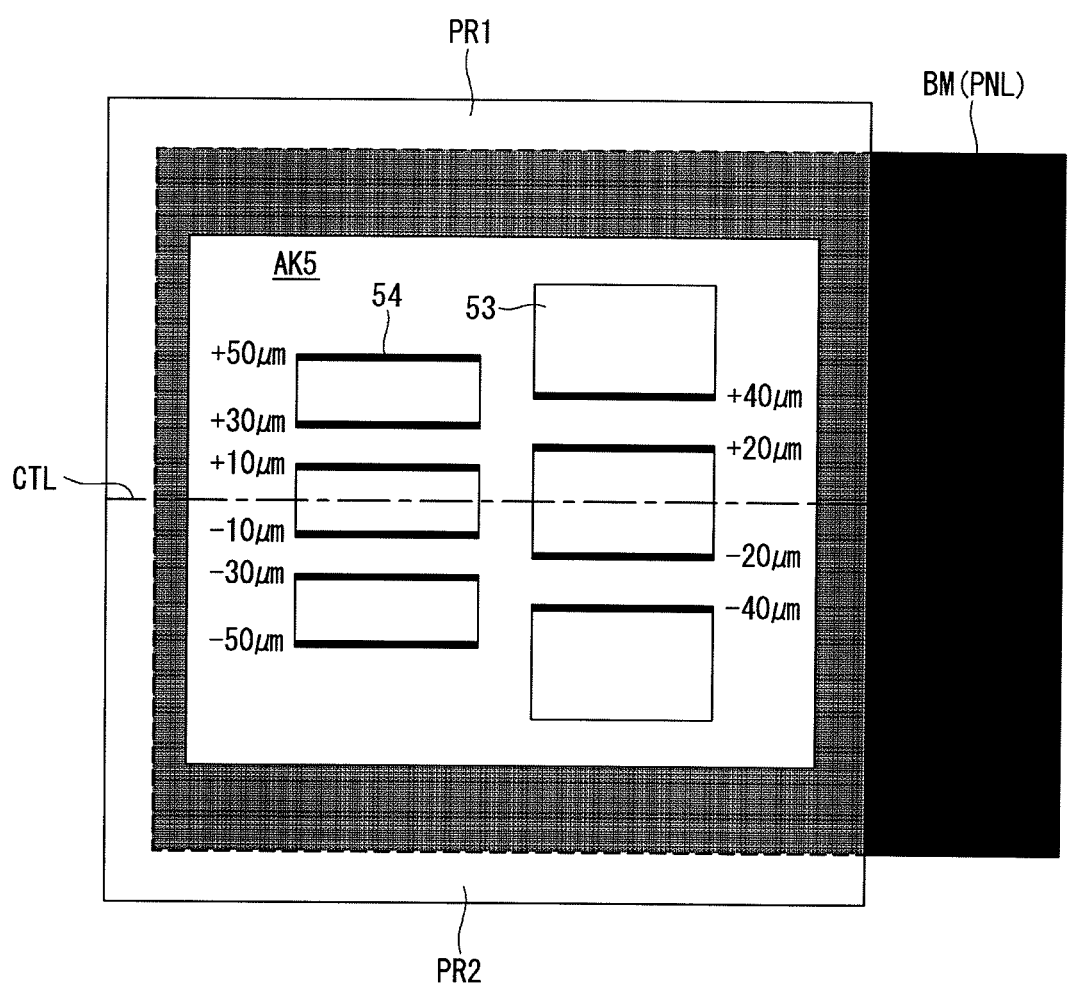

When the reference line CTL of the film pattern retarder FPR meets the panel reference line CTL_PNL as shown in FIGS. 8A and 8B, the display panel PNL is ideally aligned with the film pattern retarder FPR.

An align margin may be permissible that enables image quality of more than a predetermined level to be secured for 3D images. The align margin is set within a permissible alignment error range AMR that is permissible to the extent that a user does not feel a lowering in quality of 3D images to less than a predetermined level. Experimentally, the permissible alignment error range AMR includes an area from an ideally aligned status to +30 µm and from the ideally aligned status to −30 µm. Accordingly, when the alignment line CTL of the film pattern retarder FPR is aligned within the permissible alignment error range AMR, it can be determined that the aligned status between the film pattern retarder FPR and the display panel PNL is good.

FIGS. 7A and 7B are expanded plan views illustrating some align marks according to embodiments, wherein FIG. 7A shows the second align mark AK2, and FIG. 7B shows the fifth align mark AK5. Each of the left-sided align marks AK1 to AK3 has substantially the same pattern as the second align mark AK2. Each of the right-sided align marks AK4 to AK6 has substantially the same patterns as the fifth align mark AK5.

Referring to FIGS. 7A and 7B, the second align mark AK2 includes a left-sided align pattern 61 and a right-sided align pattern 62.

The left-sided align pattern 61 includes a single pattern. A width (or thickness) of the left-sided align pattern 61 is a distance from the panel reference line CTL_PNL to an uppermost end of the permissible align margin AMR. For example, a width of the left-sided align pattern 61 is +30 µm from the panel reference line CTL_PNL.

The right-sided align pattern 62 includes a single pattern whose horizontal axis deviates from a horizontal axis of the left-sided align pattern 61. A width (or thickness) of the right-sided align pattern 62 is a distance from the panel reference line CTL_PNL to a lowermost end of the permissible align range AMR. For example, a width of the right-sided align pattern 62 is −30 µm from the panel reference line CTL_PNL.

The patterns of the fifth align mark AK5 are vertically symmetrical with the patterns of the second align marks AK2. The fifth align mark AK5 includes a left-sided align patterns 64 and a right-sided align patterns 63.

The left-sided align pattern 64 includes a single pattern. A width (or thickness) of the left-sided align pattern 64 is a distance from the panel reference line CTL_PNL to a lowermost end of the permissible align range AMR. For example, a width of the left-sided align pattern 64 is −30 µm from the panel reference line CTL_PNL.

The right-sided align pattern 63 includes a single pattern whose horizontal axis deviates from a horizontal axis of the left-sided align pattern 64. A width (or thickness) of the right-sided align pattern 63 is a distance from the panel reference line CTL_PNL to an uppermost end of the permissible align range (need to do global) AMR. For example, a width of the right-sided align pattern 63 is +30 µm from the panel reference line CTL_PNL.

Figure 10A:
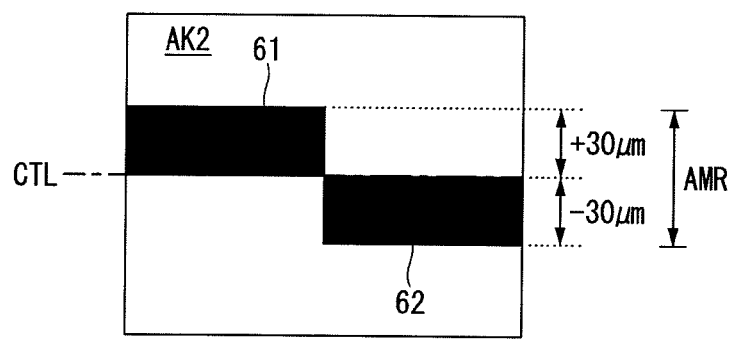
FIGS. 10A and 10B are plan views illustrating that the film pattern retarder is ideally aligned with the display panel using the align marks shown in FIGS. 7A and 7B.
Figure 10B:
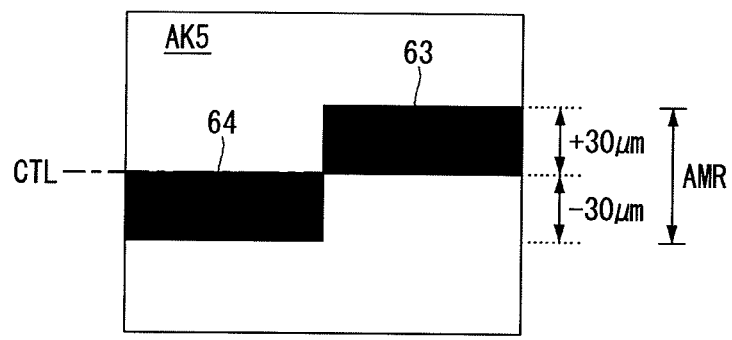

As shown in FIGS. 10A and 10B, when the panel reference line CTL_PNL conforms to the reference line CTL of the film pattern retarder FPR, the display panel PNL is ideally aligned with the film pattern retarder FPR. In each of the left-sided align marks AK1 to AK3 and the right-sided align marks AK4 to AK6, when each of the left-sided align patterns 61 and 64 and the right-sided align patterns 62 and 63 is formed as a single pattern as shown in FIGS. 7A and 7B, it can be intuitively and easily determined whether there is a failure in alignment between the film pattern retarder FPR and the display panel PNL. For example, when the reference line CTL of the film pattern retarder FPR deviates from any one of the left-sided align patterns 61 and 64 and right-sided align patterns 62 and 63 of the second and fifth align marks AK2 and AK5, it is determined that the film pattern retarder FPR is not aligned well with the display panel PNL. On the contrary, when the reference line CTL of the film pattern retarder FPR deviates from none of the left-sided align patterns 61 and 64 and right-sided align patterns 62 and 63 of the second and fifth align marks AK2 and AK5, it is determined that the film pattern retarder FPR is aligned well with the display panel PNL.

According to an embodiment of the invention, a position of one of the dummy patterns DUM1 and DUM2 is determined and a position of the reference line CTL of the film pattern retarder FPR is identified that is away from the dummy patterns DUM1 and DUM2 by a distance between the dummy patterns DUM1 and DUM2 and the reference line CTL of the film pattern retarder FPR. According to an embodiment of the invention, the reference line CTL of the film pattern retarder FPR is aligned with the second and fifth align marks AK2 and AK5 formed at two opposite sides of a central portion of the display panel PNL, thereby aligning the film pattern retarder FPR with the display panel PNL.

According to an embodiment of the invention, the dummy patterns DUM1 and DUM2 of the film pattern retarder FPR are used as reference patterns necessary for estimating a position of the reference line of the film pattern retarder FPR. Accordingly, it is not needed to correctly align the align marks AK1, AK3, AK4, and AK6 positioned at the upper and lower peripheral portions of the display panel PNL and the dummy patterns DUM1 and DUM2 of the film pattern retarder FPR. According to an embodiment of the invention, while the reference line CTL of the film pattern retarder FPR and/or display panel PNL are positioned so that the reference line CTL of the film pattern retarder FPR is located at a center of the second and fifth align marks AK2 and AK5, the film pattern retarder FPR is aligned with the display panel PNL and then joined to each other.

When the film pattern retarder FPR and the display panel PNL are joined to each other while the film pattern retarder FPR and the display panel PNL in a good aligned state, the first dummy pattern DUM1 formed at the upper end of the film pattern retarder FPR is opposite to the first and fourth align marks AK1 and AK4 formed at two opposite sides of the upper end of the display panel PNL. The second dummy pattern DUM2 formed at the lower end of the film pattern retarder FPR is opposite to the third and sixth align marks AK1 and AK6 formed at two opposite sides of the lower end of the display panel PNL.

Figure 9A:
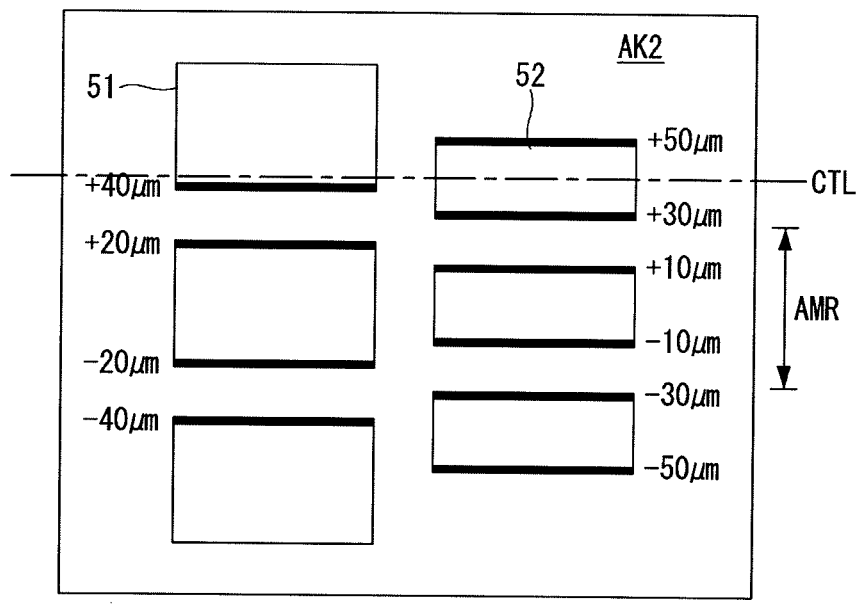
FIGS. 9A and 9B are plan views illustrating a status where the film pattern retarder and the display panel are misaligned with each other using the align marks shown in FIGS. 6A and 6B.
Figure 9B:
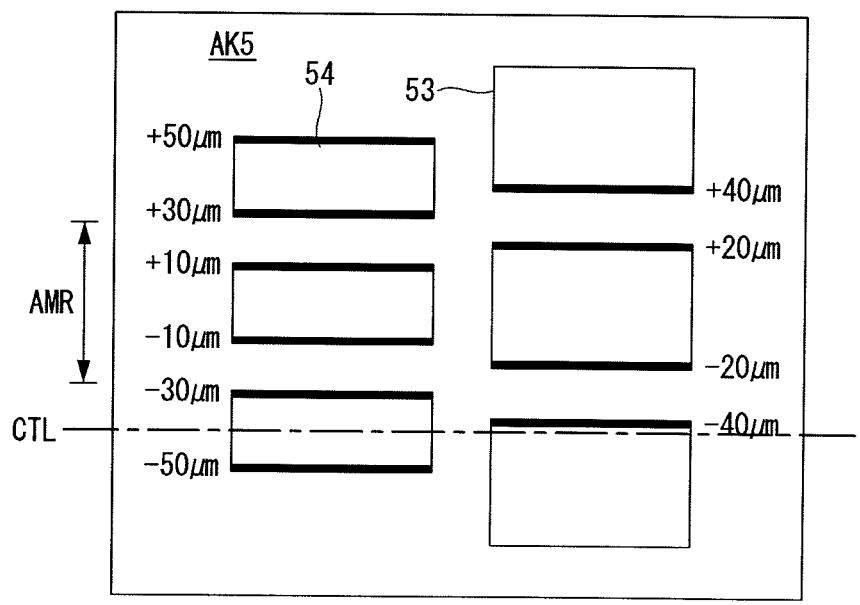

FIGS. 8A and 8B are plan views illustrating a status where the film pattern retarder FPR and the display panel PNL are ideally aligned with each other using the align marks AK2 and AK5 shown in FIGS. 6A and 6B. FIGS. 9A and 9B are plan views illustrating a status where the film pattern retarder FPR and the display panel PNL are misaligned with each other using the align marks AK2 and AK5 shown in FIGS. 6A and 6B.

Referring to FIGS. 8A and 8B, each of the align marks AK1 to AK6 is formed in a bezel area of the display panel PNL, which has no black matrix. According to an embodiment of the invention, the degree of a misalignment between the film pattern retarder FPR and the display panel PNL can be intuitively and correctly known based on a difference in distance between the reference line CTL of the film pattern retarder FPR and markings formed at the display panel PNL. The "markings formed at the display panel PNL" refers to the markings formed at the align marks AK2 and AK5.

When the film pattern retarder FPR is aligned with the display panel PNL, if the reference line CTL of the film pattern retarder FPR is within a permissible alignment error range AMR from each of two opposite sides of the display panel PNL, it is determined that the aligned status is good. When the reference line CTL of the film pattern retarder FPR deviates from the permissible alignment error range AMR from either of the two opposite sides of the display panel PNL as shown in FIGS. 9A and 9B, it is determined that the aligned status is bad.

Figure 11A:
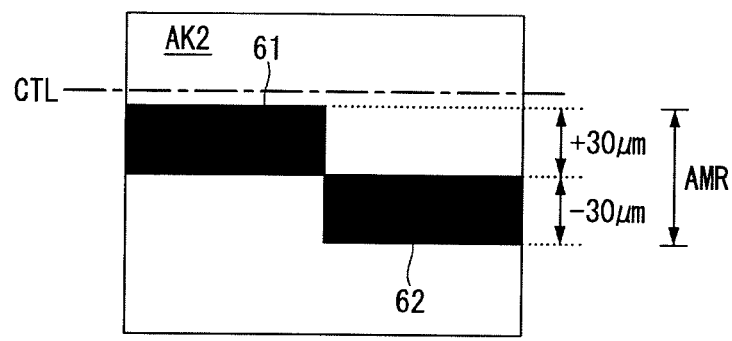
FIGS. 11A and 11B are plan views illustrating that the film pattern retarder is misaligned with the display panel using the align marks shown in FIGS. 7A and 7B.
Figure 11B:
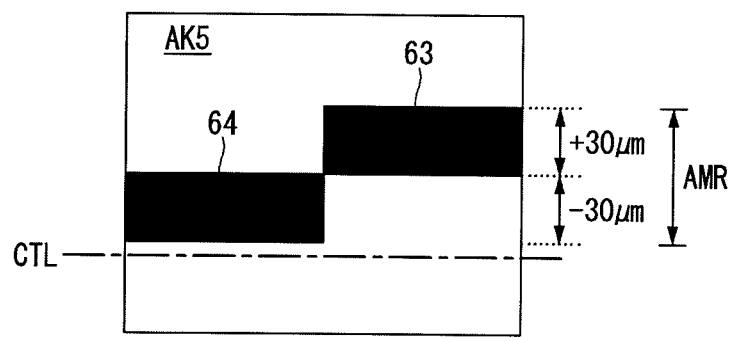

FIGS. 10A and 10B are plan views illustrating that the film pattern retarder FPR is ideally aligned with the display panel PNL using the align marks AK2 and AK5 shown in FIGS. 7A and 7B. FIGS. 11A and 11B are plan views illustrating that the film pattern retarder FPR is misaligned with the display panel PNL using the align marks AK2 and AK5 shown in FIGS. 7A and 7B.

Referring to FIGS. 10A and 10B, each of the align marks AK1 to AK6 is formed in a bezel area of the display panel PNL, which has no black matrix BM. According to an embodiment of the invention, the degree of a misalignment between the film pattern retarder FPR and the display panel PNL can be intuitively and correctly known based on a difference in distance between the reference line CTL of the film pattern retarder FPR and markings formed at the display panel PNL.

When the film pattern retarder FPR is aligned with the display panel PNL, and if the reference line CTL of the film pattern retarder FPR overlaps the left-sided align patterns 61 and 64 of the display panel PNL and the reference line CTL overlaps the right-sided align patterns 62 and 63 of the display panel PNL as shown in FIGS. 10A and 10B, the alignment error is within the permissible error range AMR and the aligned status is thus determined to be good. When the film pattern retarder FPR is aligned with the display panel PNL, the reference line CTL of the film pattern retarder FPR and the align marks AK1 to AK6 of the display panel PNL are displayed on a monitor of a control computer through a vision system. When the reference line CTL of the film pattern retarder FPR overlaps the left-sided align patterns 61 and 64 of the display panel PNL and the reference line CTL overlaps the right-sided align patterns 62 and 63 of the display panel PNL, the reference line CTL of the film pattern retarder FPR is not seen in the patterns 61 to 64 of the align marks AK2 and AK5 as shown in FIGS. 10A and 10B.

When the reference line CTL of the film pattern retarder FPR overlaps neither the left-sided align patterns 61 and 64 nor the right-sided align patterns 62 and 63 as shown in FIGS. 11A and 11B, the aligned status is determined to be bad.

Figure 12A:
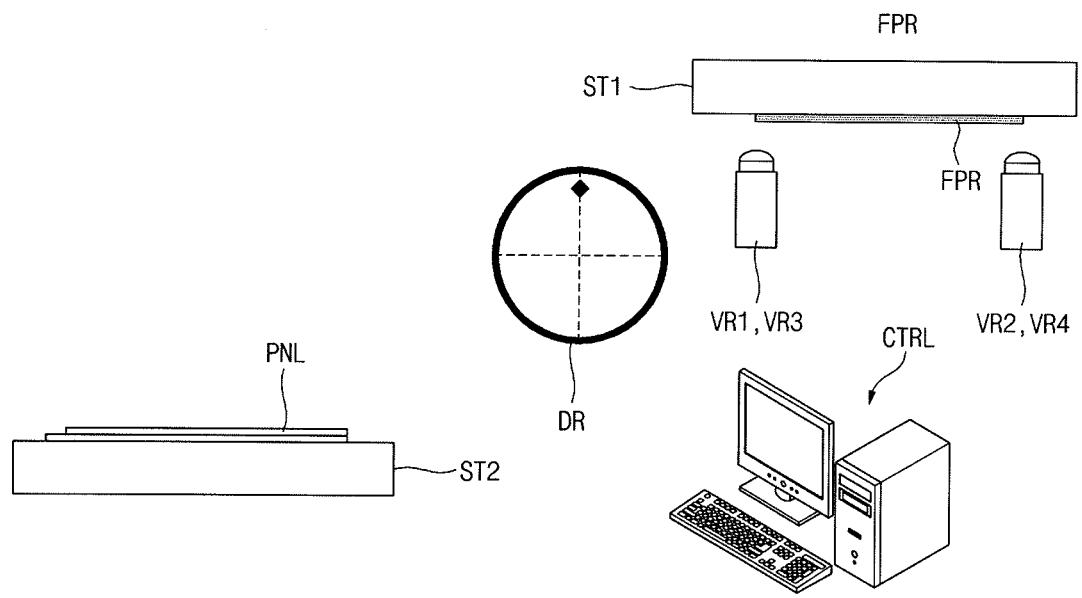
FIGS. 12A and 12D are views illustrating an alignment system for a stereoscopic image display apparatus according to an embodiment.
Figure 12B:
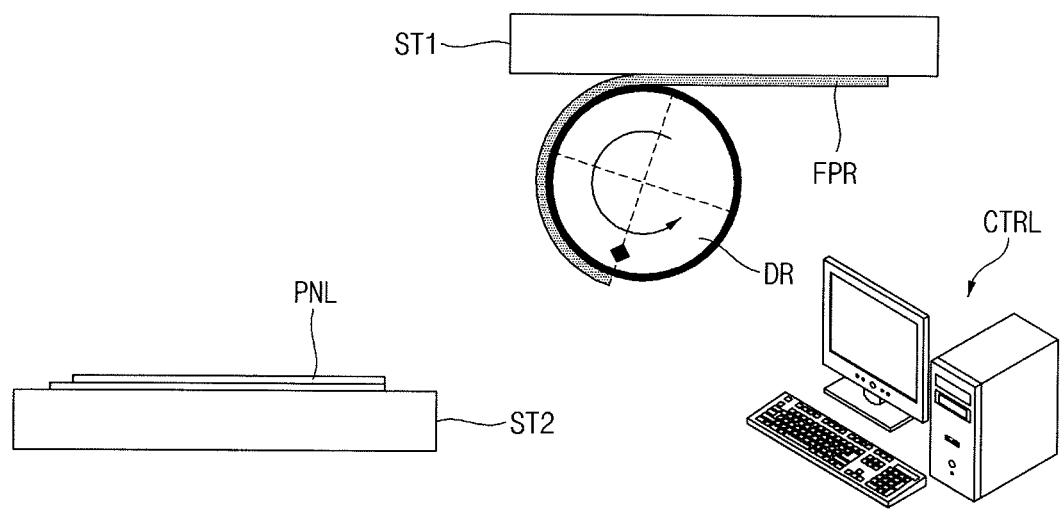
Figure 12C:
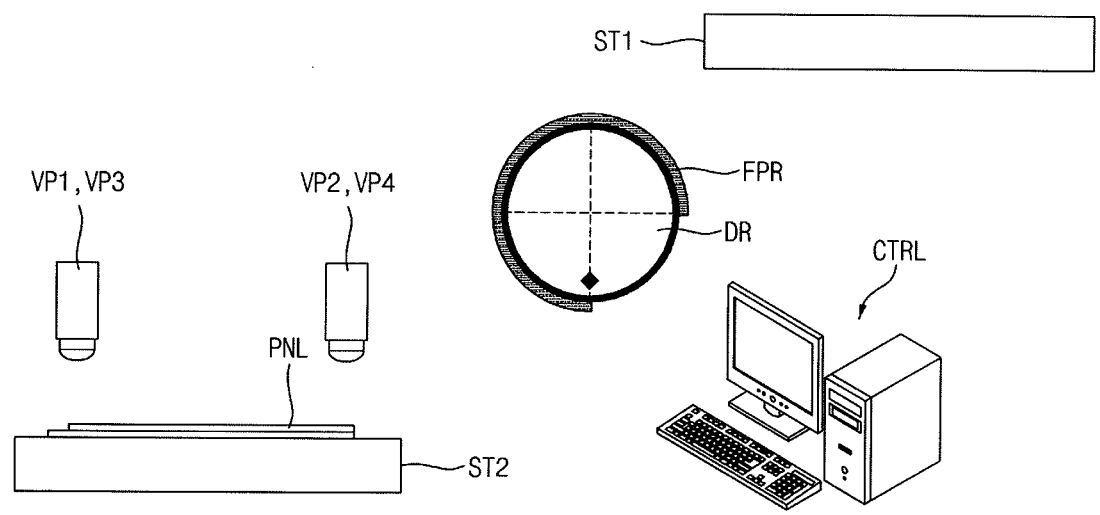
Figure 12D:
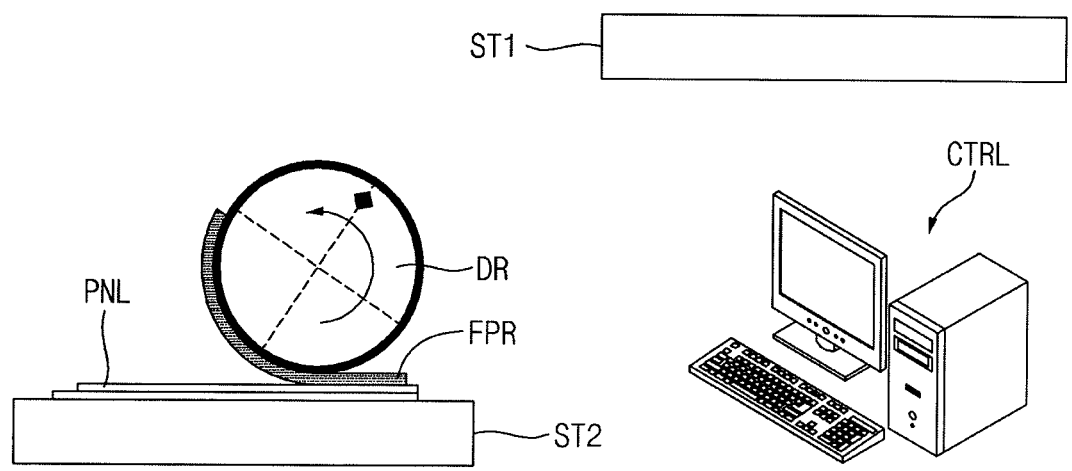

FIGS. 12A and 12D are views illustrating an alignment system for a stereoscopic image display apparatus according to an embodiment.

Referring to FIGS. 12A to 14, an alignment system according to an embodiment includes a first align stage ST1, a first vision system VR1 to VR4, a second align stage ST2, a second vision system VP1 to VP4, a drum DR, and a control computer CTRL.

Figure 13:
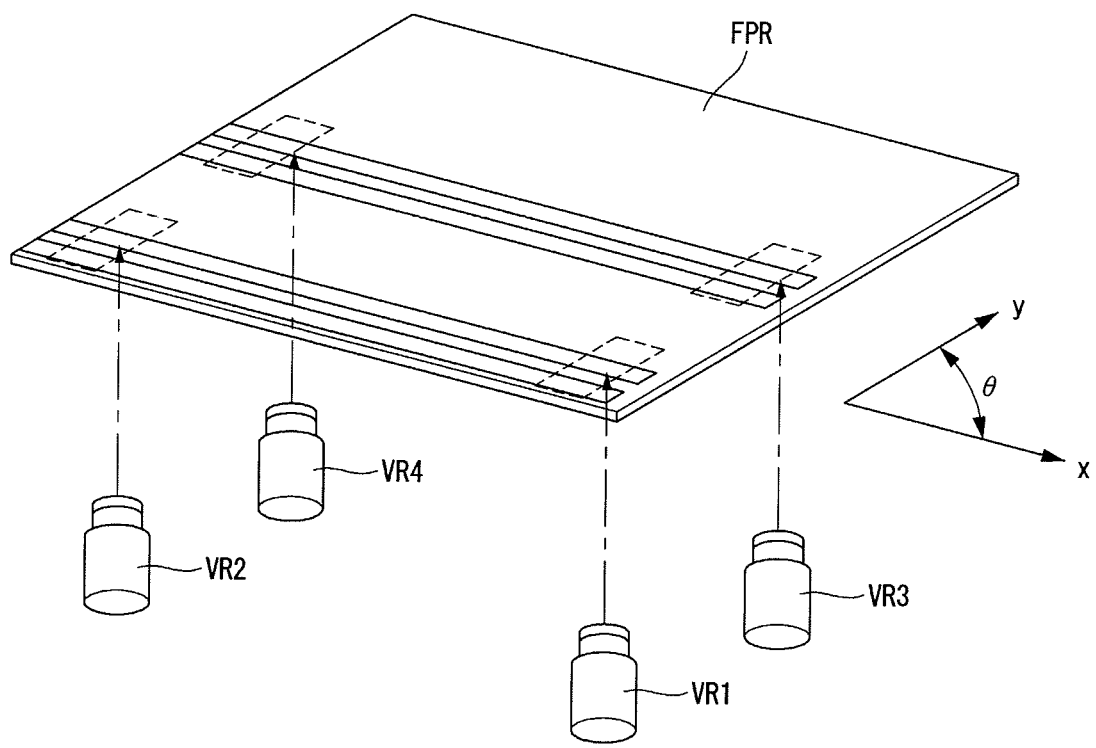
FIG. 13 is a perspective view illustrating a pattern retarder and a first vision system.

The first align stage ST1 attracts and holds the film pattern retarder FPR. The first align stage ST1 is connected to an xy robot. As shown in FIG. 13, the xy robot moves the first align stage ST1 in x and y-axial directions under control of the control computer CTRL. The first align stage ST1 can rotate in a θ-axial direction under control of the control computer CTRL. Accordingly, the first align stage ST1 finely adjusts the film pattern retarder FPR in the x, y, and θ-axial directions as shown in FIG. 13 under control of the control computer CTRL to control an aligned status of the pattern retarder FPR.

The first vision system VR1 to VR4 includes first to fourth vision modules VR1 to VR4 as shown in FIG. 13. The first and second vision modules VR1 and VR2 capture images of two opposite sides of the first dummy pattern DUM1 or second dummy pattern DUM2 of the film pattern retarder FPR and transmit the captured images to the control computer CTRL. The third and fourth vision modules VR3 and VR4 capture images of two opposite sides of the reference line CTL located at a center of the film pattern retarder FPR and images of two opposite sides of the first and second polarization selection patterns PR1 and PR2 neighbored with respect to the reference line CTL and transfer the captured images to the control computer CTRL. Accordingly, the first vision system VR1 to VR4 captures four edges of the film pattern retarder FPR fixed on the first align stage ST1 and transfers the captured images to the control computer CTRL.

Figures 14, 15:
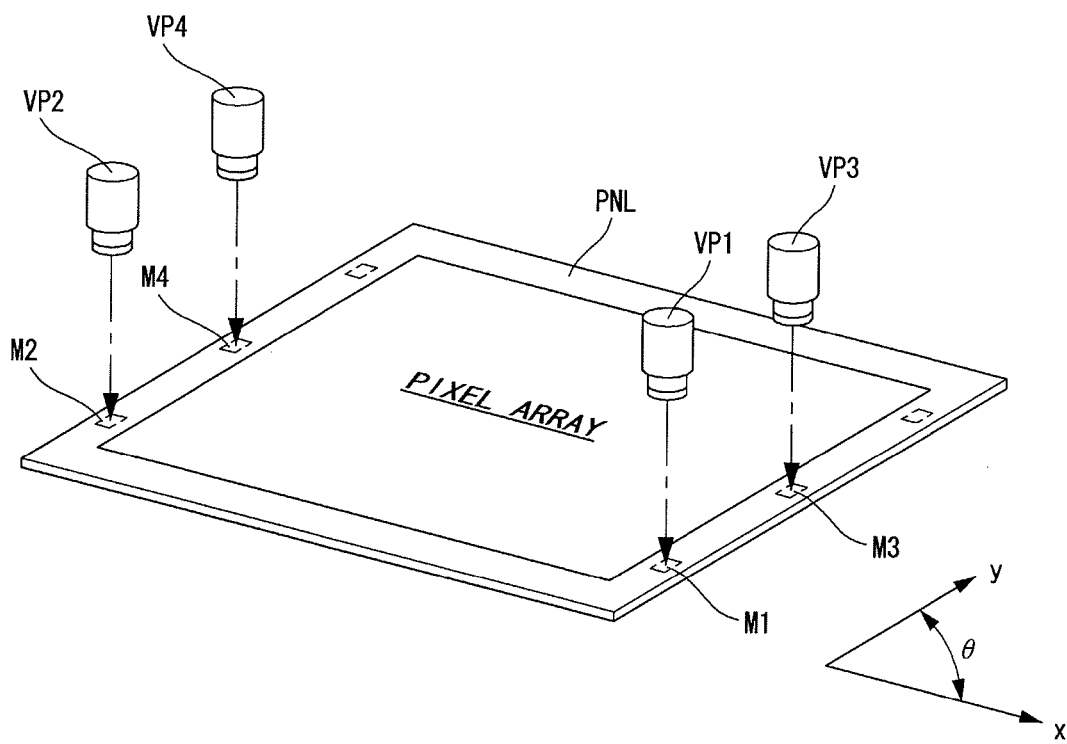
FIG. 14 is a perspective view illustrating a display panel and a second vision system.
FIG. 15 is a cross sectional view illustrating a cross section of a film pattern retarder.

The second align stage ST2 attracts and holds the display panel PNL. The second align stage ST2 is connected to an xy robot. As shown in FIG. 14, the xy robot moves the second align stage ST2 in x and y-axial directions under control of the control computer CTRL. The second align stage ST2 can rotate in a θ-axial direction under control of the control computer CTRL. Accordingly, the second align stage ST2 finely adjusts the display panel PNL in the x, y, and θ-axial directions as shown in FIG. 14 under control of the control computer CTRL to control an aligned status of the display panel PNL.

The second vision system VP1 to VP4 includes first to fourth vision modules VP1 to VP4 as shown in FIG. 14. The first and second vision modules VP1 and VP2 capture images of align marks AK1 and AK4 formed at two opposite sides of an upper end of the display panel PNL or images of align marks AK3 and AK6 formed at two opposite sides of a lower end of the display panel PNL and transfer the captured images to the control computer CTRL. The third and fourth vision modules VP3 and VP4 capture images of the align marks AK2 and AK5 formed at two opposite sides of a center of the display panel PNL and transfer the captured images to the control computer CTRL. Accordingly, the second vision system VP1 and VP4 transfers images of the four align marks formed on the display panel PNL over the second align stage ST2 to the control computer CTRL.

The drum DR is provided between the first and second align stages ST1 and ST2. The drum DR is rotated by a motor under control of the control computer CTRL and moved by a linear guide means in upper and lower directions (z-axial direction). After the film pattern retarder FPR located on the first stage ST1 is aligned well with the display panel PNL located on the second stage ST2, the drum DR receives the film pattern retarder FPR from the first align stage ST1 and attaches the film pattern retarder FPR onto the display panel seated on the second align stage ST2 under control of the control computer CTRL. The drum DR includes an adhesive layer or adhesive film with a little viscosity so that the film pattern retarder FPR is stably wound onto the drum DR.

The control computer CTRL controls the operation of all of the components of the alignment system according to a preset program and controls the whole procedure for alignment between the display panel PNL and the film pattern retarder FPR. Distances between the dummy patterns DUM1 and DUM2 and the reference line CTL of the film pattern retarder FPR are pre-stored in the control computer CTRL.

The control computer CTRL identifies the dummy patterns DUM1 and DUM2 based on the images received from the first and second vision modules VR1 and VR2 of the first vision system VR1 to VR4. The control computer CTRL calculates a position of the reference line CTL of the film pattern retarder FPR from positions of the dummy patterns DUM1 and DUM2 and activates the first align stage ST1 based on the calculated result to move the reference line CTL of the film pattern retarder FPR to a desired location.

Subsequently, the control computer CTRL compares the images obtained by the first and second vision systems VR1 to VR4 and VP1 to VP4. The control computer CTRL determines an alignment error between the film pattern retarder FPR and the display panel PNL by comparing the received images. When the alignment error departs from a permissible alignment error range AMR, the control computer CTRL activates the first and second stages ST1 and ST2 or xy robot to adjust the position of the film pattern retarder FPR and/or display panel PNL until the panel reference CTL_PNL of the align marks AK2 and AK5 of the display panel PNL and the reference line CTL of the film pattern retarder FPR are positioned within the permissible alignment error range AMR.

A virtual central line showing the panel reference line CTL_PNL the second and fifth align marks AK2 and AK5 and the reference line CTL of the film pattern retarder FPR obtained by the first vision system are displayed on the monitor of the control computer CTRL.

The control computer CTRL can control the second stage ST2 to adjust the position of the display panel PNL so that the virtual central line conforms to the panel reference line CTL_PNL. Further, the control computer CTRL can adjust the position of the film pattern retarder FPR until the virtual central line conforming to the panel reference line CTL_PNL and the reference line CTL of the film pattern retarder FPR are located within the permissible arrangement error range AMR.

When the film pattern retarder FPR and the display panel PNL are ideally adjusted with each other or the alignment error is within the permissible arrangement error range AMR as shown in FIGS. 8A and 8B and 10A and 10B, the drum DR is activated to move the film pattern retarder FPR toward the display panel PNL so that the film pattern retarder FPR is joined with the display panel PNL.

According to an embodiment of the invention, the alignment system further includes a peel-off device that peels off a release film of the film pattern retarder FPR to expose the adhesive layer of the film pattern retarder FPR. The alignment system can adjust the aligned status between the film pattern retarder FPR and the display panel PNL by controlling the position of the film pattern retarder FPR based on the display panel PNL when aligning the film pattern retarder FPR and the display panel PNL. Accordingly, y-axis and θ-axis calibration functions for the second stage ST2 can be omitted, and the drum DR can be implemented to move only in upper and lower directions (z-axial direction).

A method of aligning the display panel PNL and the film pattern retarder FPR are sequentially described below.

After fixing the film pattern retarder FPR on the first align stage ST1 as shown in FIG. 12A, the control computer CTRL identifies an aligned status of the film pattern retarder FPR through the first vision system VR1 to VR4. The control computer CTRL analyzes one of images for the dummy patterns DUM1 and DUM2 captured by the first vision system VR1 to VR4 to identify positions of the dummy patterns DUM1 and DUM2.

The control computer CTRL activates the first align stage ST1 to adjust the position of the film pattern retarder FPR so that the reference line CTL of the film pattern retarder FPR can be seen on the images obtained by the third and fourth vision modules VR3 and VR4. The control computer CTRL compares and analyzes the images obtained by the third and fourth vision modules VR3 and VR4 of the first vision system and the images obtained by the third and fourth vision modules VP3 and VP4 of the second vision system to activate the xy robot or the first align stage ST1 so that the reference line CTL of the film pattern retarder FPR and the panel reference line CTL_PNL are positioned within the permissible alignment error range AMR. When the reference line CTL of the film pattern retarder FPR conforms to the panel reference line CTL_PNL or the alignment error is within the permissible alignment error range AMP, the control computer CTRL judges that the aligned status is good and activates the drum DR to perform an attachment operation.

After aligning the film pattern retarder FPR on the first align stage ST1, the control computer CTRL moves the first align stage ST1 in the x-axial direction or moves the drum DR. The control computer CTRL brings a surface of the drum DR in contact with the film pattern retarder FPR and then rotates the drum DR counterclockwise to transfer the aligned film pattern retarder FPR to the drum DR as shown in FIGS. 12B and 12C. Subsequently, the control computer CTRL peels off the release film of the film pattern retarder FPR as attached or adhered onto the drum DR to expose the adhesive of the film pattern retarder FPR. The release film is peeled off manually or automatically by an automatic peel-off device.

The control computer CTRL activates the second align stage ST2 based on the images of the align marks AK2 and AK5 of the display panel PNL as obtained through the third and fourth vision modules VP3 and VP4 of the second vision system VP1 to VP4, thereby being able to adjust the aligned status of the display panel PNL. Since only the position of the film pattern retarder FPR can be adjusted based on the display panel PNL when the film pattern retarder FPR is adjusted with the display panel PNL, a procedure of adjusting the position of the display panel PNL can be omitted.

The control computer CTRL compares and analyzes images received from the first vision system VR1 to VR4 and the second vision system VP1 to VP4, and when a distance between the reference line CTL of the film pattern retarder FPR and the panel reference line CTL_PNL is within the alignment error range AMR, the control computer CTRL moves the drum DR down toward the second align stage ST2. When the adhesive of the film pattern retarder FPR wound around the drum DR is brought in contact with the surface of the display panel PNL, the control computer CTRL attaches the film pattern retarder FPR onto the display panel PNL while rotating the drum DR counterclockwise as shown in FIG. 12D.

Since the film pattern retarder FPR does not include separate align marks, the film pattern retarder FPR can be manufactured in a continuous production process.

In the embodiment of the invention discussed above, although a rotating drum DR is used as a means for transferring or moving the film pattern retarder FPR towards the display panel PNL so that the film pattern retarder FPR is joined with the display panel PNL, in other embodiments of the invention, other devices or means may be used.

Figure 16:
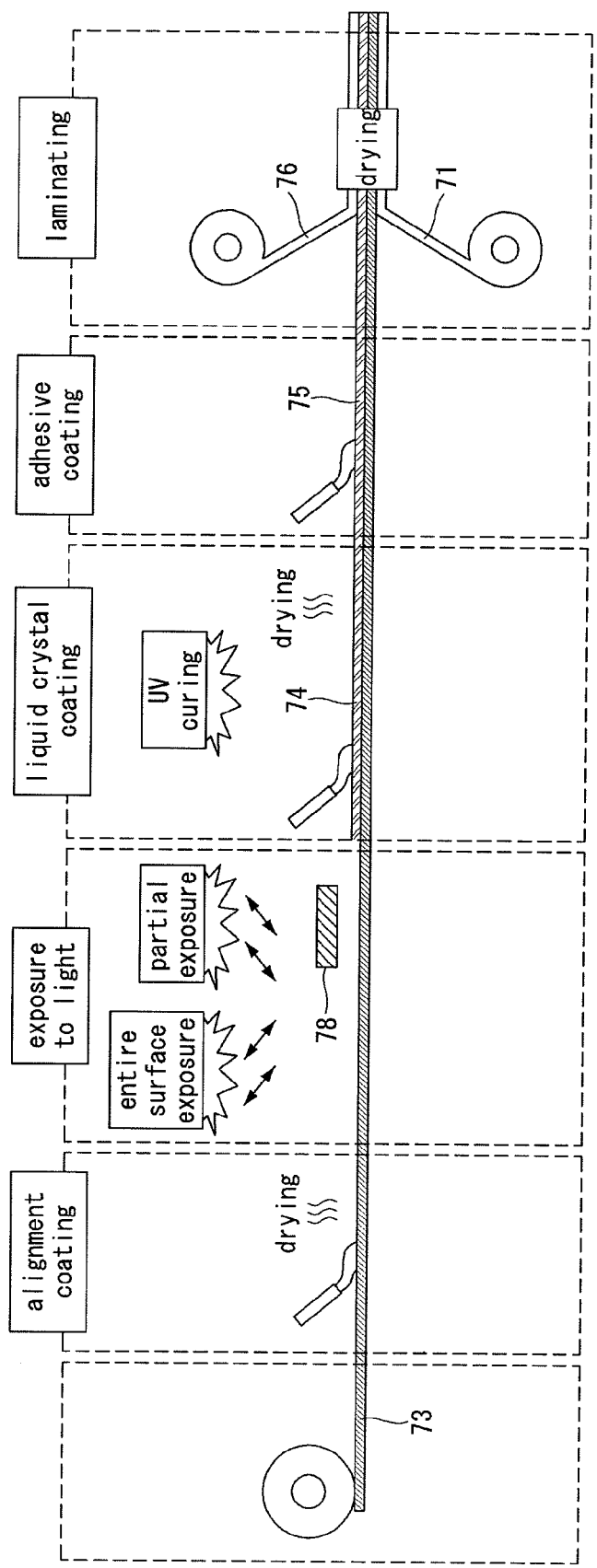
FIG. 16 is a view illustrating a continuous production process of a film pattern retarder.
Figure 17:
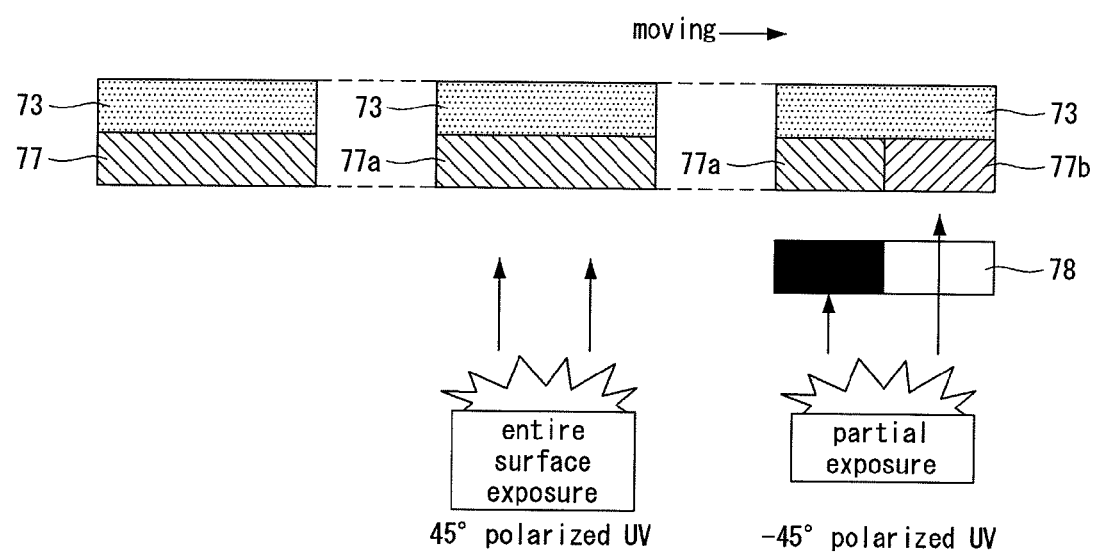
FIG. 17 is a view illustrating in detail a light exposing process.

FIG. 15 is a cross sectional view illustrating a structure of a cross section of the film pattern retarder FPR. FIG. 16 is a view illustrating a continuous production process of the film pattern retarder FPR. FIG. 17 is a view illustrating in detail the light exposing process shown in FIG. 16.

The film pattern retarder FPR includes a film base 73, a protection film 71, a pattern layer 74, an adhesive 75, and a release film 76 as shown in FIG. 15. A surface treatment layer 72 is formed between the protection film 71 and the film base 73.

The surface treatment layer 72 is formed on the film base 73, and the protection film 71 covers the surface treatment layer 72. The pattern layer 74 is formed under the film base 73, and the adhesive 75 is applied onto the pattern layer 74. The release film 76 covers the adhesive 75.

The film base 73 functions as a substrate on which the pattern layer 74 is formed, and is selected as a TAC (Triacetyl Cellulose) film, a COP (Cyclo Olefin Co-Polymer) film, or an acrylic-based film. The pattern layer 74 includes the polarization selection patterns PR1 and PR2 and dummy patterns DUM1 and DUM2 for making polarization different between the left-eyed image and right-eyed image as shown in FIG. 3. The patterns of the pattern layer 74 include a liquid crystal layer that is subjected to optical alignment. The protection film 71 is formed of PET (Poly ethylene terephthalate) or a polymer resin having similar characteristics to those of PET. A manufacturing process of the film base 73 is shown in FIGS. 16 and 17.

An embodiment of the invention includes coating of an alignment film 77 onto the film base 73 while moving the surface-treated film base 73 as shown in FIGS. 16 and 17 and drying the alignment film 77.

According to an embodiment of the invention, a front surface of the alignment film 77 coated on the film base 73 is exposed to 45° polarized UV (Ultra Violet) rays while the film base 73 is moved in a direction by a predetermined speed and the alignment film 77a having the UV exposed front surface is then subjected to UV exposure using −45° polarized UV rays through a mask 78. Subsequently, according to an embodiment of the invention, while the film base 73 is moved along a direction by a predetermined speed, a liquid crystal layer containing a light curing agent is formed on the alignment film 77 having the 45° aligned pattern 77a and −45° aligned pattern 77b and UV rays are then irradiated onto the liquid crystal layer to cure and dry the liquid crystal layer. The pattern layer 74 including the first polarization selection pattern PR1 of the liquid crystal layer having a −45° alignment angle and the second polarization selection pattern PR2 of the liquid crystal layer having a 45° alignment angle is formed on the film base 73 which has gone through these exposure process and liquid crystal coating process.

Subsequently, according to an embodiment of the invention, with the film base 73 moved in a direction by a predetermined speed, the adhesive 75 is coated on the pattern layer 74 and the release film 76 is then formed on the adhesive 75 and the protection film 71 is formed on the film base 73.

The process of manufacturing the film pattern retarder FPR contains no align marks on the film pattern retarder FPR as shown in FIGS. 16 and 17, and thus, the various layers as shown in FIG. 15 can be continuously formed on the film base 73 while moving the film base 73 without stopping the film base 73.

As described above, according to the embodiments of the invention, the pattern retarder and the display panel are aligned with each other using the polarization selection patterns for separating polarization characteristics of the left-eyed and right-eyed images in the pattern retarder, so that the pattern retarder and the display panel can be correctly aligned and joined to each other without forming separate align marks on the pattern retarder. Further, according to the embodiments, since separate processes are not required for forming align marks in the process of manufacturing the pattern retarder, it can be possible to easily perform the process for the pattern retarder and to save costs for manufacturing the pattern retarder. Further, according to the embodiments, the permissible alignment error range is marked at the align marks formed in the display panel to be intuitively identified so that the error in alignment between the pattern retarder and the display panel can be intuitively and correctly calculated.

Figure 18:
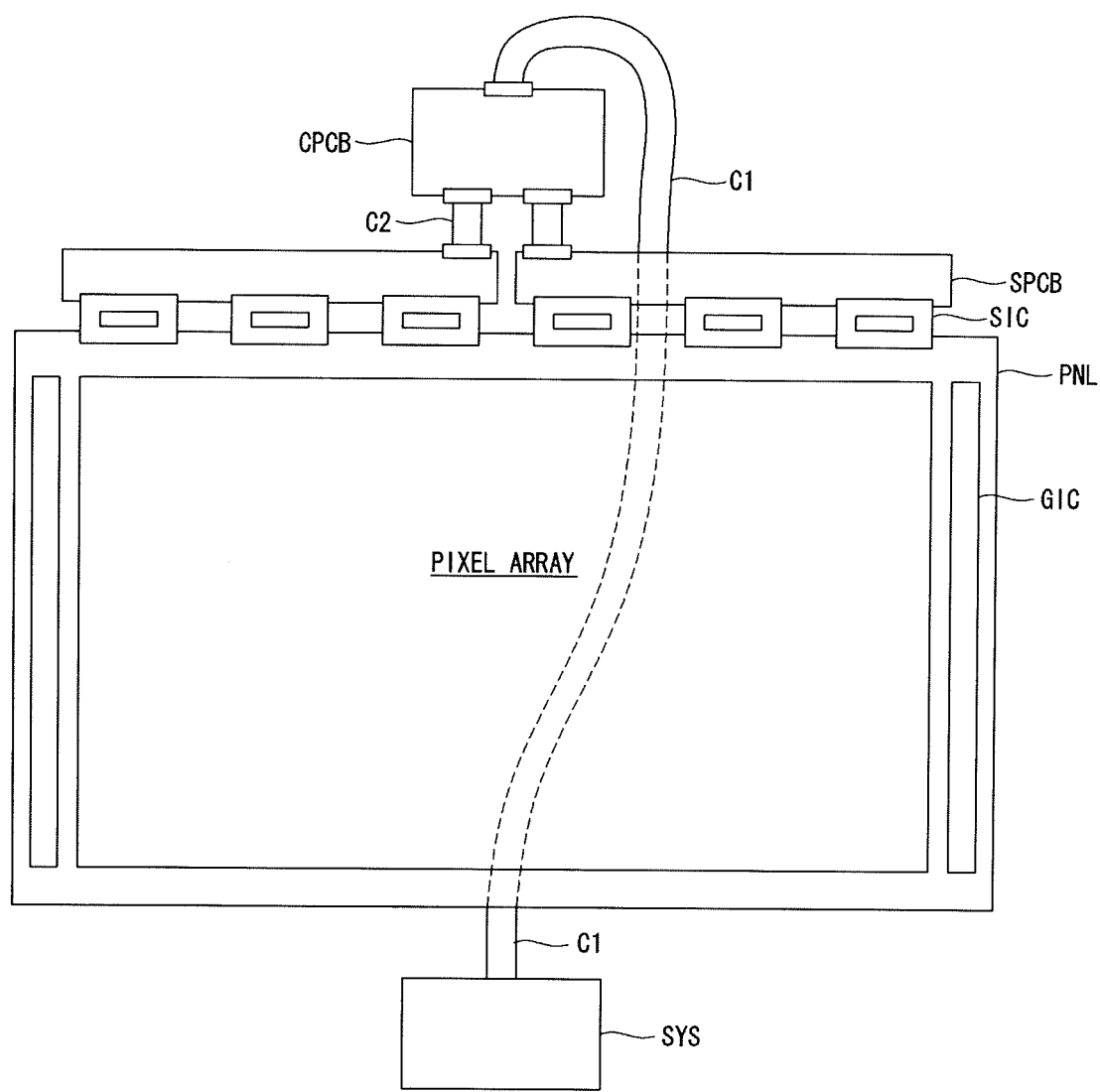
FIG. 18 is a view illustrating an assembled status of a forward-model stereoscopic image display apparatus according to an embodiment.
Figure 19:
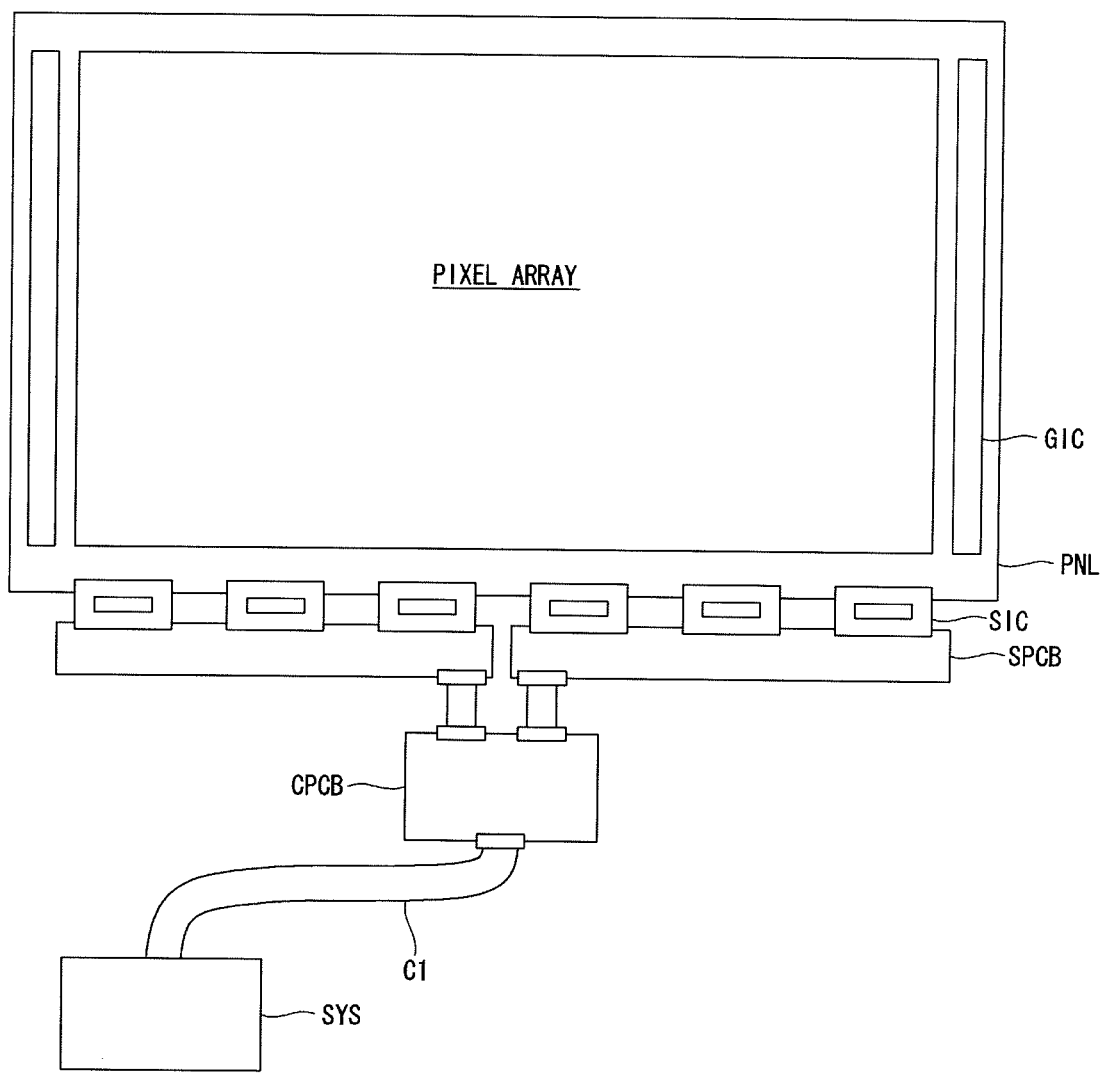
FIG. 19 is a view illustrating an assembled status of a reverse-model stereoscopic image display apparatus according to an embodiment.

A stereoscopic image display apparatus is applied with different assembling methods according to a forward model as shown in FIG. 18 and a reverse model as shown in FIG. 19. In the forward model, a display panel is assembled in a host system in a forward posture without reversing between an upper side and a lower side. In contrast, in the reverse model, the display panel is assembled in the host system in a reverse posture in which the upper and lower sides are reversed to each other.

In the forward model, the first polarization selection patterns PR1 of the film pattern retarder FPR transmits left-eyed image light displayed on odd-numbered display lines of the display panel PNL as first polarization light and transmits right-eyed image light displayed on even-numbered display lines of the display panel PNL as second polarization light. According to an embodiment of the invention, in the forward model, the left-eyed filter of the polarization glasses PGLS passes through the first polarized left-eyed image light incident through the first polarization selection patterns PR1, and the right-eyed filter of the polarization glasses PGLS passes through the second polarized right-eyed image light incident through the first polarization selection patterns PR1. The film pattern retarder FPR can be joined with the display panel in the reverse model in the same type as the forward model.

According to an embodiment of the invention, in the reverse model, right-eyed image data is displayed on the odd-numbered display lines of the display panel PNL, and the right-eyed image light is transmitted as the first polarization light through the first polarization selection patterns PR1 of the film pattern retarder FPR. In the reverse model, left-eyed image data is displayed on the even-numbered display lines of the display panel PNL, and the left-eyed image light is transmitted as the second polarization light through the second polarization selection patterns PR2 of the film pattern retarder FPR. Accordingly, since the film pattern retarder FPR is attached onto the display panel PNL of the reverse model in the same type as the forward model and the same data as in the forward model is input to the display panel PNL, a viewer sees the right-eyed image through the left-eyed filter of the polarization glasses PGLS and the left-eyed image through the right-eyed filter of the polarization glasses PGLS, and thus, the viewer perceives a pseudoscopic vision rather than viewing a normal 3D image. In the reverse model, the host system can transfer the left-eyed and right-eyed images reversed to each other to the driving circuit of the display panel PNL to match the left-eyed/right-eyed images displayed on the display panel PNL with the polarization characteristics of the patterns of the film pattern retarder FPR. Under this circumstance, a circuit and software for reversing and aligning the left-eyed and right-eyed images can be added in the host system. According to an embodiment of the invention, a normal 3D image can be implemented without changing an arrangement order of the left-eyed/right-eyed image data input to the driving circuit of the display panel PNL by joining the film pattern retarder FPR with the display panel PNL with the film pattern retarder FPR one line shifted up (or down) in the reverse model compared to the forward-model film pattern retarder FPR.

FIG. 18 is a view illustrating an assembled status of a forward-model stereoscopic image display apparatus according to an embodiment of the invention. FIG. 19 is a view illustrating an assembled status of a reverse-model stereoscopic image display apparatus according to an embodiment.

Referring to FIGS. 18 and 19, stereoscopic image display apparatuses according to embodiments of the invention include a display panel PNL, a display panel driving circuit, a source PCB (Printed Circuit Board) SPCB, a control PCB CPCB, and a system board SYS of a host system. The display panel driving circuit includes a data driving circuit and a gate driving circuit.

Figure 22:
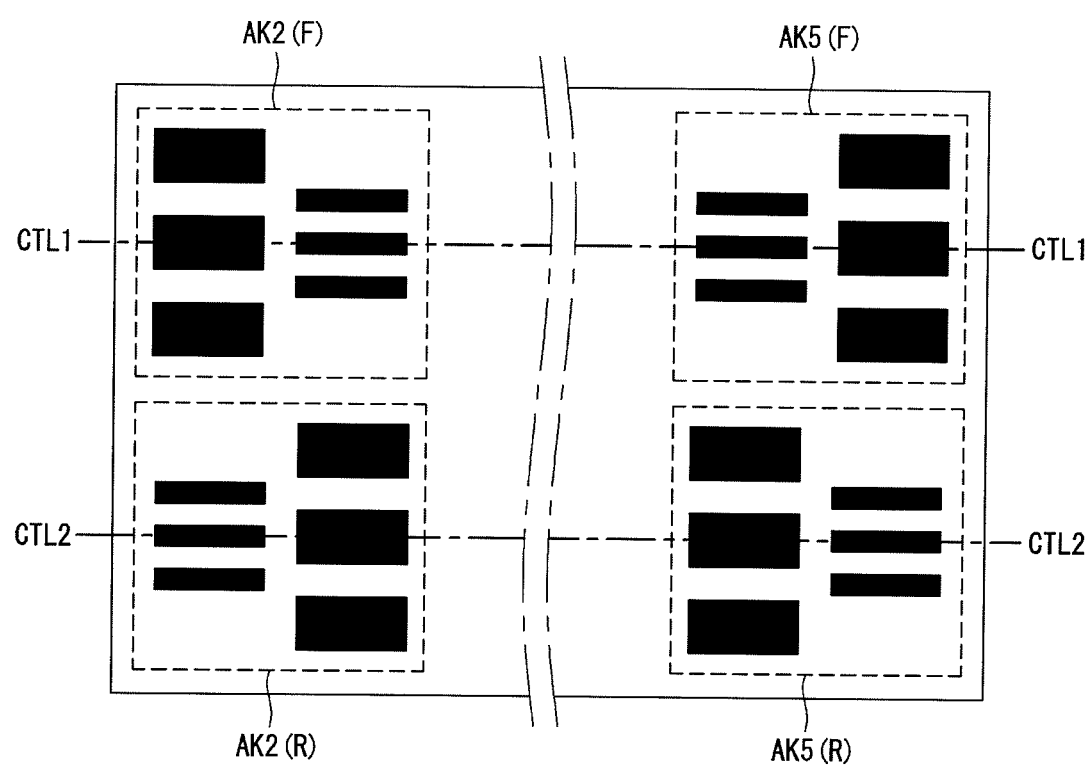
FIGS. 22 and 23 are plan views illustrating an align mark corresponding to a forward model and an align mark corresponding to a reverse model as jointly formed on a display panel.
Figure 23:
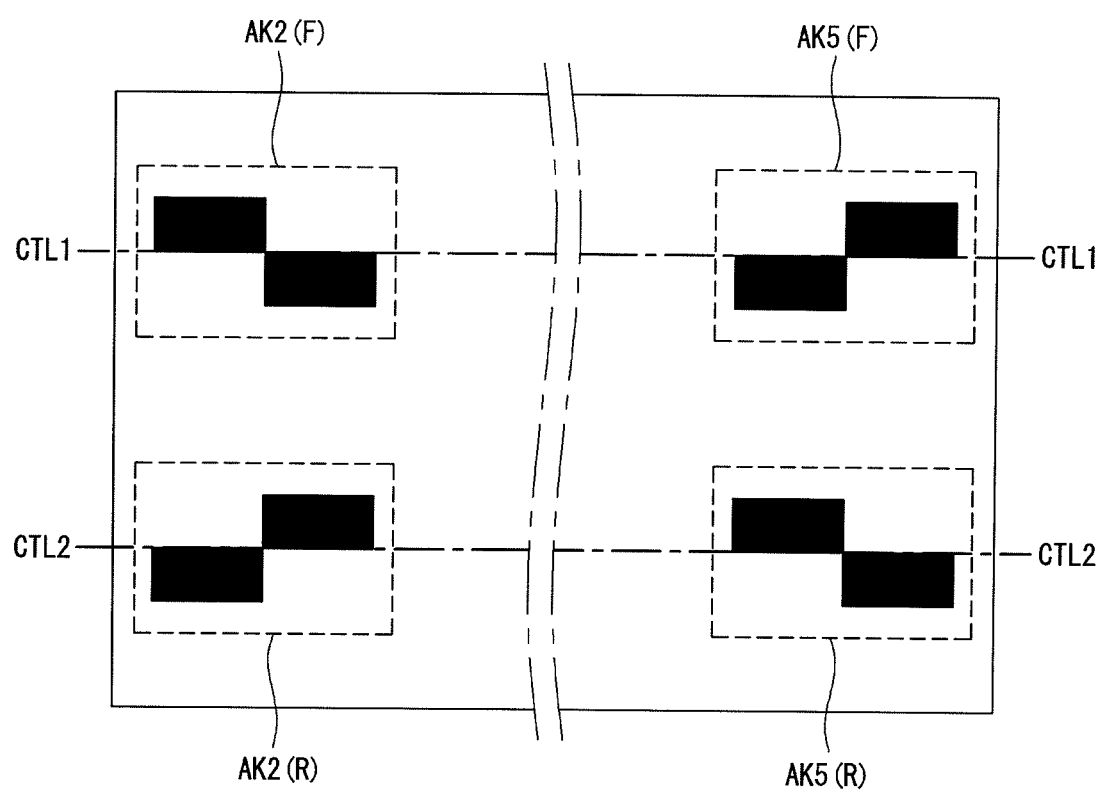

As described earlier, the display panel PNL is implemented as a flat panel display and includes align marks as shown in FIGS. 6A, 7B, 22, and 23 which are to be aligned with the reference line CTL of the film pattern retarder FPR. The align marks include align marks AK2(F) and AK5(F) corresponding to a forward model and align marks AK2(R) and AK5(R) corresponding to a reverse model as shown in FIGS. 22 and 23, respectively. The data driving circuit includes a plurality of source drive ICs SIC. The source drive ICs SIC latch digital video data input from a timing controller formed on the control PCB CPCB under control of the timing controller. The source drive ICs SIC convert the digital video data to analog positive/negative gamma reference voltages to generate positive/negative data voltages. The positive/negative data voltages output from the source drive ICs are supplied to data lines of the display panel. The source drive ICs SIC are connected to the data lines of the display panel PNL by a COG (Chip On Glass) process or by a TAB (Tape Automated Bonding) process.

The gate driving circuit includes a plurality of gate drive ICs GIC. The gate drive ICs GIC sequentially supply gate pulses to gate lines under control of the timing controller. The gate drive ICs GIC are connected to the gate lines of the display panel PNL by a TAB process. Shift registers of the gate drive ICs GIC are directly formed on a substrate of the display panel PNL by a GIP (Gate In Panel) process.

The control computer CTRL includes a timing controller and a module power circuit.

The timing controller rearranges the digital video data input from the system board SYS of the host system and supplies the rearranged data to the source drive ICs SIC. The timing controller generates timing control signals for controlling operation timing of the source drive ICs SIC and gate drive ICs GIC based on timing signals input from the system board SYS, such as a vertical sync signal Vsync, a horizontal sync signal Hsync, a data enable signal DE, and a dot clock CLK.

The module power circuit includes a DC-DC convertor and a regulator. The module power circuit boosts a DC input voltage to generate analog driving voltages for driving a pixel array of the display panel PNL.

The system board SYS of the host system is connected to a video source, such as, for example, a set-top box, a TV system, a phone system, a DVD player, a Blue-ray player, a personal computer (PC), a home theater system, etc. The system board SYS includes a graphic processing circuit, such as a scaler that interpolates RGB video data input from the video source so that the resolution of the RGB video data complies with the resolution of the display panel PNL, and a main power circuit generating a DC input voltage to be supplied to the module power circuit. The system board SYS transfers input image data and timing signals Vsync, Hsync, DE, and CLK to the timing controller of the control computer CTRL through an interface, such as an LVDS (Low Voltage Differential Signaling) interface or a TMDS (Transition Minimized Differential Signaling) interface.

The system board SYS converts a 2D mode operation and a 3D mode operation to each other in response to user data input through a user input device. The user input device includes a keypad, a keyboard, a mouse, an on-screen display (OSD), a remote controller, and a touch screen. A viewer can select a 2D mode or 3D mode through the user input device and can select 2D-3D image conversion in the 3D mode.

The system board SYS can convert the 2D and 3D mode operations to each other through a 2D/3D identification code encoded to the input image data. The system board SYS transfers a mode signal for converting the operation mode to the 2D or 3D mode to the timing controller.

The system board SYS is connected to the control computer CTRL through a first flexible cable C1, such as a flexible flat cable (FFC), and a connector. The control computer CTRL is connected to the source PCB SPCB through a second flexible cable C2, such as a flexible flat cable (FFC), and a connector.

In the forward model shown in FIG. 18, the source drive ICs SIC, source PCB SPCB, and the control computer CTRL are arranged over the display panel PNL, and the system board SYS is arranged under the display panel PNL. Accordingly, since in the forward model, the distance between the control computer CTRL and the system board SYS is large, the length of the first flexible connector C1 increases.

In the reverse model as shown in FIG. 19, the source drive ICs SIC, the source PCB SPCB, and the control computer CTRL are arranged under the display panel PNL. The system board SYS is arranged under the display panel PNL. Accordingly, since a distance between the control computer CTRL and the system board SYS is short, the length of the first flexible connector C1 becomes shorter than that as shown in FIG. 18.

The embodiment described in connection with FIGS. 12A to 12D can apply to the alignment method and system for aligning and joining the display panel PNL and the film pattern retarder FPR as shown in FIGS. 18 and 19.

Figure 20:
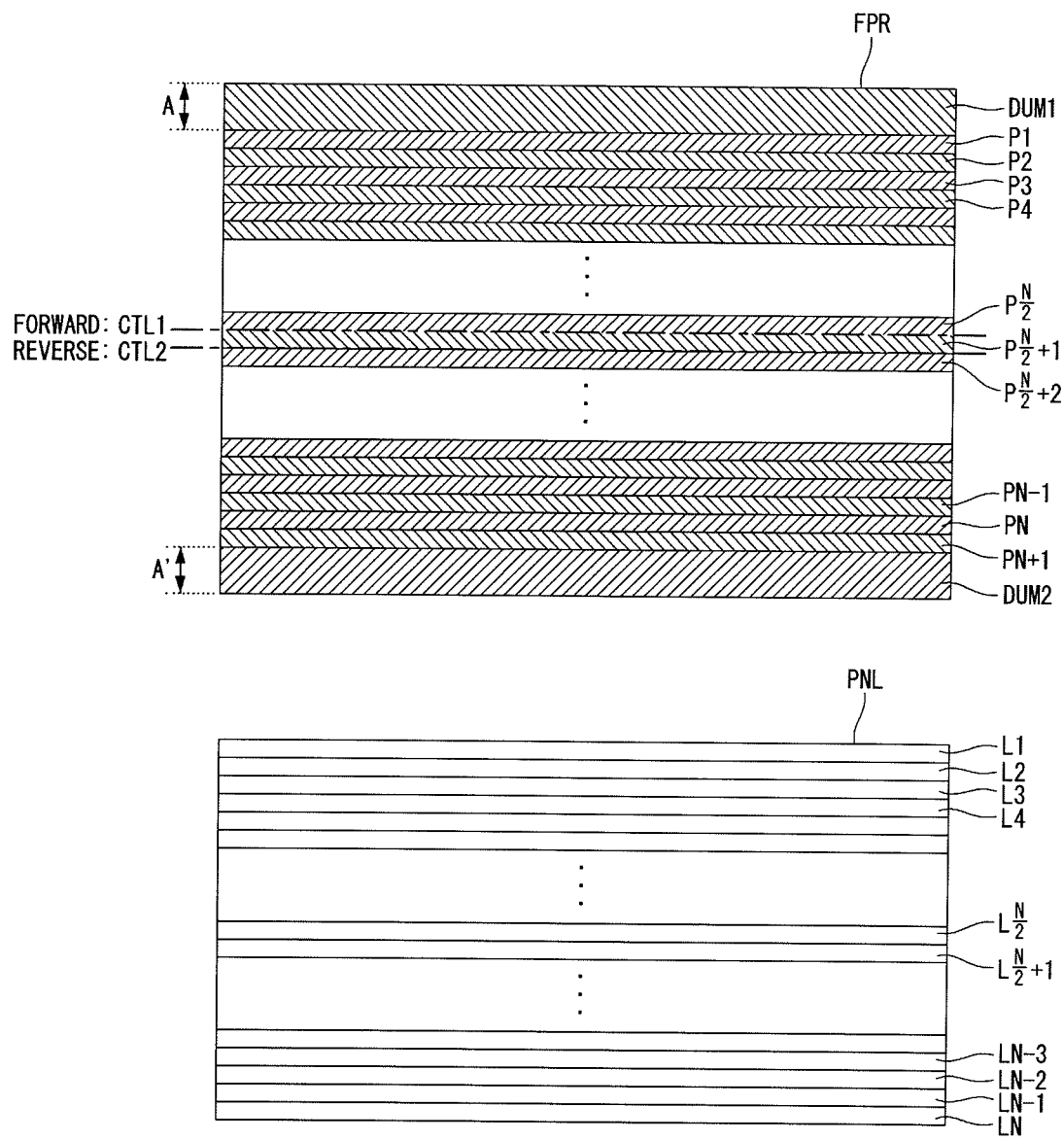
FIG. 20 is a plan view illustrating in detail a film pattern retarder according to an embodiment.
Figure 21:
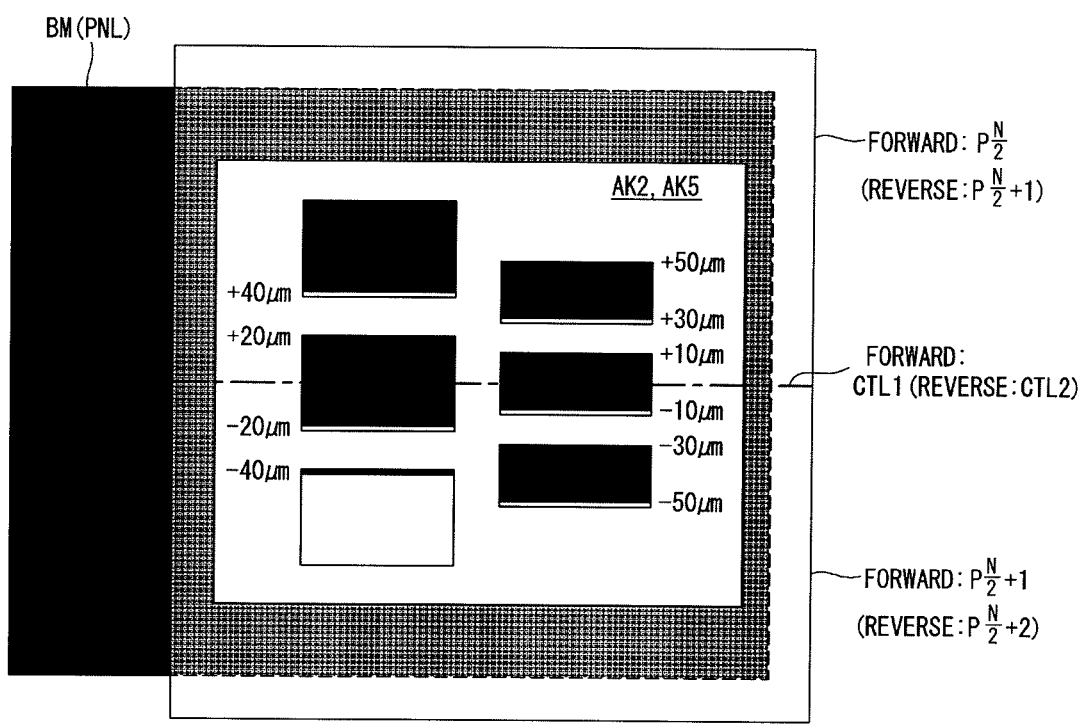
FIG. 21 is a plan view illustrating an ideal aligned status between a film pattern retarder and a display panel in forward and reverse models.

FIG. 20 is a plan view illustrating in detail a film pattern retarder according to an embodiment. FIG. 21 is a plan view illustrating an ideal aligned status between a film pattern retarder and a display panel in forward and reverse models.

Referring to FIGS. 20 and 21, the number of lines in a pixel array of the display panel PNL is N (N is an even number). In contrast, the number of lines in the film pattern retarder FPR is N+1. The film pattern retarder FPR includes polarization selection patterns P1 to PN+1 respectively formed in the N+1 lines.

In the forward model, when the film pattern retarder FPR and the display panel PNL are aligned with each other, the N polarization selection patterns from a first polarization selection pattern P1 formed at a first line to an Nth polarization selection pattern PN formed at an Nth line in the film pattern retarder FPR are opposite to the N lines of the display panel PNL in a one-to-one correspondence manner. In other words, the N polarization selection patterns of the film pattern retarder FPR respectively correspond to the N lines of the display panel PNL. In the forward model, the first line of the display panel PNL is opposite to the first line of the film pattern retarder FPR. In the forward model, the Nth line of the display panel PNL is opposite to the Nth line of the film pattern retarder FPR.

In the reverse model, when the film pattern retarder FPR and the display panel PNL are aligned with each other, the N polarization selection patterns P2 to PN+1 from a second polarization selection pattern P2 formed at a second line to an N+1th polarization selection pattern PN+1 formed at an N+1th line in the film pattern retarder FPR are opposite to the N lines of the display panel PNL in a one-to-one correspondence manner. In other words, the N polarization selection patterns of the film pattern retarder FPR respectively correspond to the N lines of the display panel PNL. In the reverse model, the first line of the display panel PNL is opposite to the N+1th line of the film pattern retarder FPR. In the reverse model, the Nth line of the display panel PNL is opposite to the second line of the film pattern retarder FPR.

The first polarization selection patterns of the film pattern retarder FPR transmitting first polarized light of the left-eyed image (or right-eyed image) are polarization selection patterns P1, P3, . . . , PN/2+1, . . . , PN−1, and PN+1 that are arranged at the odd-numbered lines of the film pattern retarder FPR in FIG. 20. The second polarization selection patterns of the film pattern retarder FPR transmitting second polarized light of the right-eyed image (or left-eyed image) are polarization selection patterns P2, P4, . . . , PN/2, . . . , and PN that are arranged at the even-numbered lines of the film pattern retarder FPR in FIG. 20. Accordingly, the number of the first polarization selection patterns P1, P3, . . . , PN/2+1, . . . , PN−1, and PN+1 is N/2+1 in the film pattern retarder FPR as shown in FIG. 20, and the number of the second polarization selection patterns P2, P4, . . . , PN/2, . . . , and PN is N/2. The optical axis of the first polarization selection patterns P1, P3, . . . , PN/2+1, . . . , PN−1, and PN+1 is N/2+1 is perpendicular to the optical axis of the second polarization selection patterns P2, P4, . . . , PN/2, . . . , and PN is N/2.

In the forward model of display panel PNL, the first line L1 of the pixel array is positioned at an upper end and the Nth line is positioned at a lower end as shown in FIG. 20. The forward model of display panel PNL displays a left-eyed image on the odd-numbered lines and a right-eyed image on the even-numbered lines in the 3D mode. In the reverse model of display panel PNL, contrary to the forward model of display model PNL, the first line L1 of the pixel array is positioned at the lower end and the Nth line is positioned at the upper end. Compared to the forward model of display panel PNL, the reverse model of display panel PNL has upper and lower sides changed to each other, and thus, displays a right-eyed image on the odd-numbered lines and a left-eyed image on the even-numbered lines in the 3D mode.

In the film pattern retarder FPR of the forward model, the first polarization selection patterns P1, P3, . . . , PN/2+1, . . . , and PN−1 other than the N+1th line of the first polarization selection pattern PN+1 are opposite to the even-numbered lines L1, L3, . . . , LN/2+1, . . . , LN−1 of the display panel PNL to convert the left-eyed image light displayed on the odd-numbered lines L1, L3, . . . , LN/2+1, . . . , and LN−1 of the display panel PNL into the first polarized light. In the forward model of film pattern retarder FPR, the second polarization selection patterns P2, P4, PN/2, . . . , PN are opposite to the even-numbered lines L2, L4, . . . , LN/2, . . . , LN of the display panel PNL to convert the right-eyed image light displayed on the even-numbered lines L2, L4, . . . , LN/2, . . . , LN of the display panel PNL into the second polarized light.

The left-eyed filter of the polarization glasses has the same optical axis as those of the first polarization selection patterns P1, P3, . . . , PN/2+1, . . . , PN−1, PN+1 of the film pattern retarder FPR. The right-eyed filter of the polarization glasses has the same optical axis as those of the second polarization selection patterns P2, P4, . . . , PN/2, . . . , PN of the film pattern retarder FPR. Accordingly, in the forward model, the left-eyed filter of the polarization glasses transmits the first polarized light of left image, which has passed through the first polarization selection patterns P1, P3, . . . , PN/2+1, . . . , PN−1, PN+1 of the film pattern retarder FPR. The right-eyed filter of the polarization glasses transmits the second polarized light of left image, which has passed through the second polarization selection patterns P2, P4, . . . , PN/2, . . . , PN of the film pattern retarder FPR.

In the reverse model film pattern retarder FPR, the second polarization selection patterns P2, P4, . . . , PN/2, . . . , PN are opposite to the odd-numbered lines L1, L3, . . . , LN/2+1, . . . , LN−1 of the display panel PNL to convert the right-eyed image light displayed on the odd-numbered lines L1, L3, . . . , LN/2+1, . . . , LN−1 of the display panel PNL into the second polarized light. In the reverse model film pattern retarder FPR, the first polarization selection patterns P3, . . . , PN/2+1, . . . , PN−1, PN+1 other than the first polarization selection pattern P1 of the first line are opposite to the even-numbered lines L2, L4, . . . , LN/2, . . . , LN of the display panel PNL to convert the left-eyed image light displayed on the even-numbered lines L2, L4, . . . , LN/2, . . . , LN of the display panel PNL into the first polarized light.

The left-eyed filter of the polarization glasses has the same optical axis as those of the first polarization selection patterns P3, . . . , PN/2+1, . . . , PN−1, PN+1. The right-eyed filter of the polarization glasses has the same optical axis as those of the second polarization selection patterns P2, P4, . . . , PN/2, . . . , PN of the film pattern retarder FPR. Accordingly, in the reverse model, the left-eyed filter of the polarization glasses transmits the first polarized light of left image, which has passed through the first polarization selection patterns P3, . . . , PN/2+1, . . . , PN−1, PN+1 of the film pattern retarder FPR. In the reverse model, the right-eyed filter of the polarization glasses transmits the second polarized light of right image, which has passed through the second polarization selection patterns P2, P4, . . . , PN/2, . . . , PN of the film pattern retarder FPR.

The film pattern retarder FPR can be joined with the forward model display panel PNL as described above. The film pattern retarder FPR is shifted by a width of one line of the pixel array formed on the display panel PNL without a change in structure to be able to be joined with the reverse model display panel PNL. Accordingly, according to the embodiments, the same film pattern retarder FPR can be attached onto the forward model display panel PNL or reverse model display panel PNL so that a stereoscopic image can be normally realized without a phenomenon in which left and right-eyed images viewed by a viewer are reversed to each other.

The film pattern retarder FPR further includes dummy patterns DUM1 and DUM2 at upper and lower ends. The dummy patterns DUM1 and DUM2 of the film pattern retarder FPR and the align marks AK1 to AK6 of the display panel PNL have been already described and thus detailed description thereof will be omitted.

The film pattern retarder FPR includes a first reference line CTL1 corresponding to a forward model and a second reference line CTL2 corresponding to a reverse model. The reference lines CTL1 and CTL2 of the film pattern retarder FPR are boundary lines between first and second polarization selection patterns neighboring each other, which are positioned at a center of the film pattern retarder FPR, and are aligned with the align marks AK2 and AK5 formed at two opposite sides of a center of the display panel PNL.

The first reference line CTL1 is positioned apart from the second reference line CTL2 by a width of one line (or one pattern width) of the film pattern retarder FPR. The first reference line CTL1 is a boundary line between N/2th and N/2+1th lines among the first to N+1th lines of the film pattern retarder FPR. The second reference line CTL2 is a boundary line between the N/2+1th and N/2+2th lines among the first to N+1th lines of the film pattern retarder FPR.

FIGS. 22 and 23 are plan views illustrating an align mark corresponding to a forward model and an align mark corresponding to a reverse model as jointly formed on a display panel PNL. The align marks shown in FIGS. 22 and 23 are second and fifth align marks formed at two opposite sides of a center of the display panel PNL.

Referring to FIGS. 22 and 23, each align mark in the display panel PNL is implemented in the shape as shown in FIG. 6 or FIG. 7. The align marks include align marks AK2(F) and AK(5) corresponding to a forward model and align marks AK2(R) and AK5(R) corresponding to a reverse model.

The forward model-correspondent align marks AK2(F) and AK(5) are aligned with the first reference line CTL1 of the film pattern retarder FPR. The reverse model-correspondent align marks AK2(R) and AK5(R) are aligned with the second reference line CTL2 of the film pattern retarder FPR.

The forward and reverse model-correspondent align marks AK2(F) and AK(5) and AK2(R) and AK5(R) may have different shapes from each other so that left and right sides can be readily differentiated—for example, the forward and reverse model-correspondent align marks can be designed to be symmetrical to each other. Each align mark can include markings, characters, etc. According to an embodiment of the invention, some characters are normally formed on the forward model-correspondent align marks AK2(F) and AK(5), and other characters are reversely formed on the reverse model-correspondent align marks AK2(R) and AK5(R). Since in the reverse model display panel PNL, upper and lower sides are reversed to each other unlike the forward model display panel, if the characters are printed upside down with respect to the forward model posture, the characters can be normally viewed while the display panel PNL is reversed to fit for the reverse model.

According to an embodiment of the invention, the reverse model display panel PNL can be aligned with the film pattern retarder FPR with the film pattern retarder FPR down shifted by a width of one line (or one pattern width) of the film pattern retarder FPR.

As described above, according to the embodiments, in the event that one line of polarization selection pattern is added to the film pattern retarder FPR and the film pattern retarder FPR is aligned with the reverse model display panel, the film pattern retarder is up or down shifted by a width of one line (or one pattern width). As a result, the embodiments allow the film pattern retarder having the same structure to be compatibly applied to the forward and reverse model display panels, so that a normal 3D image can be implemented in the forward and reverse models without changing the left/right-eyed image data input to the display panel driving circuit to each other.

According to an embodiment of the invention, the film pattern retarder FPR can be replaced by a glass pattern retarder. Accordingly, it should be noted that the alignment system and method according to the embodiments can also apply to aligning the glass pattern retarder with the display panel without being limited to aligning the display panel with the film pattern retarder.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An align marking for a stereoscopic image display apparatus comprising a display panel, and a pattern retarder attached to the display panel, the align marking comprising:
   a first align mark formed at a left middle portion of the display panel; and
   a second align mark formed at a right middle portion of the display panel,
   wherein each of the first and second align marks comprises, one or more left patterns; and
   one or more right patterns arranged offset from the one or more left patterns,
   wherein the first and second align marks are aligned with a reference line that is based on polarization selection patterns of the pattern retarder, and
   wherein the one or more left patterns and the one or more right patterns include markings indicating distances from the reference line.

2. The align marking of claim 1, wherein the one or more left patterns and the one or more right patterns are parallel to the reference line.

3. The align marking of claim 1, wherein the first and second align marks are symmetrical about a center of the display panel.

4. The align marking of claim 1, wherein at least one of the left patterns and at least one of the right patterns are a rectangular block.

5. The align marking of claim 1, wherein at least one of the left patterns and at least one of the right patterns are a pair of parallel lines.

6. An alignment method for a stereoscopic image display apparatus comprising a display panel having a first align mark formed at a left middle portion and a second align mark formed at a right middle portion, and a pattern retarder attached to the display panel, the alignment method comprising:
   finding a reference line of the pattern retarder that is spaced apart by a predetermined distance from one of dummy patterns formed at upper and lower ends of the pattern retarder;
   aligning the reference line of the pattern retarder with the first and second align marks of the display panel; and
   attaching the pattern retarder to the display panel when the reference line of the pattern retarder is aligned with the first and second align marks of the display panel within a permissible alignment error range,
   wherein each of the first and second align marks comprises one or more left patterns and one or more right patterns arranged offset from the one or more left patterns,
   wherein the first and second align marks are aligned with the reference line that is based on a polarization selection patterns of the pattern retarder, and wherein the one or more left patterns and the one or more right patterns include markings indicating distances from the reference line.

7. The method of claim 6, wherein the one or more left patterns and the one or more right patterns are parallel to the reference line.

8. The method of claim 6, wherein the first and second align marks are symmetrical about a center of the display panel.

9. The method of claim 6, wherein at least one of the left patterns and at least one of the right patterns are a rectangular block.

10. The method of claim 6, wherein at least one of the left patterns and at least one of the right patterns are a pair of parallel lines.

11. An alignment system for a stereoscopic image display apparatus, the alignment system comprising:
   a first align stage configured to support a pattern retarder comprising dummy patterns formed at upper and lower ends, and first and second polarization selection patterns formed between the dummy patterns;
   a first vision system configured to capture any one of the dummy patterns of the pattern retarder and capture a reference line between the first and second polarization selection patterns positioned at a center of the pattern retarder;
   a second align stage configured to support a display panel having a first align mark formed at a left middle portion and a second align mark formed at a right middle portion;
   a second vision system configured to capture images of the first and second align marks of the display panel;
   a drum configured to receive the pattern retarder from the first align stage and attach the pattern retarder onto the display panel on the second align stage when the reference line of the pattern retarder is aligned with the first and second align marks of the display panel within a permissible alignment error range; and
   a control computer configured to analyze images received from the first and second vision systems and control activation of at least one of the first and second align stages and activation of the drum so that the reference line of the pattern retarder is aligned with the first and second align marks of the display panel within the permissible alignment error range.

12. The alignment system of claim 11, wherein each of the first and second align marks comprises one or more left patterns and one or more right patterns arranged offset from the one or more left patterns.

13. The alignment system of claim 11, wherein the first and second align marks are aligned with the reference line that is based on the polarization selection patterns of the pattern retarder.

14. The alignment system of claim 11, wherein the display panel is one of a forward model and a reverse model,
   in the forward model, the first polarization selection patterns of the pattern retarder transmit a left-eyed image light displayed on odd-numbered display lines of the display panel as first polarization light and transmit a right-eyed image light displayed on even-numbered display lines of the display panel as second polarization light, and
   in the reverse model, the first polarization selection patterns of the pattern retarder transmit the right-eyed image light displayed on the odd-numbered display lines of the display panel as the first polarization light and transmit the left-eyed image light displayed on the even-numbered display lines of the display panel PNL as the second polarization light.

\* \* \* \* \*